US012529814B2

(12) United States Patent
  Ourabah

(10) Patent No.: US 12,529,814 B2
(45) Date of Patent: Jan. 20, 2026

(54) SYSTEMS AND METHODS FOR DEPLOYING SEISMIC NODES

(71) Applicant: STRYDE LIMITED, Middlesex (GB)

(72) Inventor: Amine Ourabah, Guildford (GB)

(73) Assignee: STRYDE LIMITED, Middlesex (GB)

( * ) Notice: Subject to any disclaimer, the term of this patent is extended or adjusted under 35 U.S.C. 154(b) by 378 days.

(21) Appl. No.: 18/028,718

(22) PCT Filed: Oct. 11, 2021

(86) PCT No.: PCT/EP2021/078058
  § 371 (c)(1),
  (2) Date: Mar. 27, 2023

(87) PCT Pub. No.: WO2022/074258
  PCT Pub. Date: Apr. 14, 2022

(65) Prior Publication Data
  US 2023/0288596 A1   Sep. 14, 2023

(30) Foreign Application Priority Data
  Oct. 9, 2020  (GB) ..................... 2016054

(51) Int. Cl.
  *G01V 1/38*   (2006.01)
(52) U.S. Cl.
  CPC .......... *G01V 1/3808* (2013.01); *G01V 1/3817* (2013.01); *G01V 1/3852* (2013.01); *G01V 2210/1427* (2013.01)

(58) Field of Classification Search
  CPC .. G01V 1/3808; G01V 1/3817; G01V 1/3852; G01V 2210/1427
  See application file for complete search history.

(56) References Cited

U.S. PATENT DOCUMENTS 4,813,029 A * 3/1989 Erich, Jr. ................. G01V 1/16
                                                    367/75
5,214,614 A   5/1993 Baule
(Continued)

FOREIGN PATENT DOCUMENTS

CN    1247602 A    3/2000
CN  105940322 A    9/2016
(Continued)

OTHER PUBLICATIONS

PCT/EP2021/078058 International Search Report and Written Opinion dated Jan. 4, 2022 (13 p.).
(Continued)

*Primary Examiner* — Krystine E Breier
(74) *Attorney, Agent, or Firm* — CONLEY ROSE, P.C.

(57) ABSTRACT

A device for holding one or more seismic nodes during a seismic survey includes a body having an outer surface configured to be seated against a surface of the ground during the seismic survey. In addition, the device includes a first receptacle extending from the outer surface into the body. Further, the device includes a second receptacle extending from the outer surface into the body. Each receptacle has a central axis. A first reference plane containing the central axis of the first receptacle is oriented perpendicular to the central axis of the second receptacle.

7 Claims, 23 Drawing Sheets

(56) References Cited

U.S. PATENT DOCUMENTS

| | | | |
|---|---|---|---|
| 5,231,252 A * | 7/1993 | Sansone | G01V 1/16 367/173 |
| 5,867,451 A | 2/1999 | Chang et al. | |
| 6,307,808 B1 | 10/2001 | Schmidt | |
| 9,638,829 B2 * | 5/2017 | Davoodi | H04Q 9/00 |
| 11,255,991 B2 | 2/2022 | Moldoveanu et al. | |
| 11,454,732 B1 * | 9/2022 | Châtenay | G01V 1/162 |
| 2011/0051550 A1 | 3/2011 | Lindberg | |
| 2017/0137098 A1 | 5/2017 | Valsvik et al. | |
| 2019/0293821 A1 | 9/2019 | Dudley et al. | |
| 2021/0124075 A1 * | 4/2021 | Heelan | G01V 1/3852 |

FOREIGN PATENT DOCUMENTS

| | | | |
|---|---|---|---|
| EP | 1593987 A2 | 11/2005 | |
| GB | 2470784 A | 12/2010 | |

OTHER PUBLICATIONS

PCT/EP2021/078058 Article 19 Amendments filed Apr. 5, 2022 (12 p.).

Search Report dated Feb. 11, 2021, for GB Application No. 2016054.5 (3 p.).

Chinese Office Action dated Oct. 23, 2025, for Chinese Application No. 202180068510.0 (3523-00103) (10 p.).

English Translation of Chinese Office Action dated Oct. 23, 2025, for Chinese Application No. 202180068510.0 (3523-00103) (11 p.).

Wang, Changguo et al., "Current Status and Development of Earthquake Processing Systems," China Petroleum Machinery, vol. 3, No. S, pp. 115-118 (3523-00103) (4 p.).

Wang, Changguo et al., "Current Status and Development of Earthquake Processing Systems," China Petroleum Machinery, vol. 3, No. S, pp. 115-118 (English Translation) (3523-00103) (8 p.).

* cited by examiner

SYSTEMS AND METHODS FOR DEPLOYING SEISMIC NODES

CROSS-REFERENCE TO RELATED APPLICATIONS

This application is a 35 U.S.C. § 371 national stage application of PCT/EP2021/078058 filed Oct. 11, 2021, and entitled "Systems and Methods for Deploying Seismic Nodes," which claims benefit of GB patent application Serial No. 2016054.5 filed Oct. 9, 2021, and entitled "Systems and Methods for Deploying Seismic Nodes in Transition Zones," each of which is hereby incorporated herein by reference in its entirety for all purposes.

STATEMENT REGARDING FEDERALLY SPONSORED RESEARCH OR DEVELOPMENT

Not applicable.

BACKGROUND

The disclosure relates generally to seismic surveys. More particularly, the disclosure relates to systems and methods for deploying seismic nodes on land, subsea, and in transition zones for conducting seismic surveys.

Seismic surveying is used to map the Earth's subsurface. Seismic surveying can be passive when the background noise is recorded to derive information about the subsurface, or can be active when a seismic source is used to generated the seismic waves that are recorded by the receiver system, which are later processed to derive information about the subsurface. During an active seismic survey, a controlled seismic source is placed at various locations near the surface of the earth above a geologic structure of interest. The seismic source is activated to generate seismic waves or signal that travel downward through the subsurface of the Earth. The source of the down-going seismic waves might come, for example, from explosions or seismic vibrators on land, or air guns in marine environments. At interfaces between dissimilar rock layers in the subsurface geological structure, the seismic waves are partially reflected. The reflected waves return to the surface where they are detected and measured by seismic sensors positioned at many locations on the surface. Data recorded by the sensors is analysed to reveal the structure and composition of the subsurface. Multiple source/recording combinations are often combined to create a near continuous profile of the subsurface that can extend for many miles.

BRIEF SUMMARY OF THE DISCLOSURE

Embodiments of devices for holding one or more seismic nodes during a seismic survey are disclosed herein. In one embodiment, a device for holding one or more seismic nodes during a seismic survey comprises a body having an outer surface configured to be seated against a surface of the ground during the seismic survey. In addition, the device comprises a first receptacle extending from the outer surface into the body. Further, the device comprises a second receptacle extending from the outer surface into the body. Each receptacle has a central axis. A first reference plane containing the central axis of the first receptacle is oriented perpendicular to the central axis of the second receptacle.

Embodiments of seismic node assemblies for detecting and measuring seismic signals during a seismic survey are disclosed herein. In one embodiment, a seismic node assembly for detecting and measuring seismic signals during a seismic survey comprises a device for holding one or more seismic nodes. The device includes a body having an outer surface, a first receptacle extending from the outer surface into the body, and a second receptacle extending from the outer surface into the body. The outer surface includes a top side and a bottom side configured to be seated against a surface of the ground during a seismic survey. The first receptacle extends vertically from the top side. In addition, the seismic node assembly comprises a first seismic node removably seated in the first receptacle. The first seismic node has a central axis that is vertically oriented within the first receptacle. Further, the seismic node assembly comprises a second seismic node removably seated in the second receptacle.

Embodiments of methods for deploying a plurality of seismic nodes to detect and measure seismic signals during a seismic survey are disclosed herein. In one embodiment, a method for deploying a plurality of seismic nodes to detect and measure seismic signals during a seismic survey comprises (a) loading a first seismic node in a first receptacle extending from an outer surface of a body of a seismic node holding device. In addition, the method comprises (b) positioning the body of the seismic node holding device against a surface of the ground after (a). The first seismic node is disposed in the first receptacle and configured to detect and measure a plurality of P-waves moving vertically through the ground after (a) and (b).

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

Figure 2:
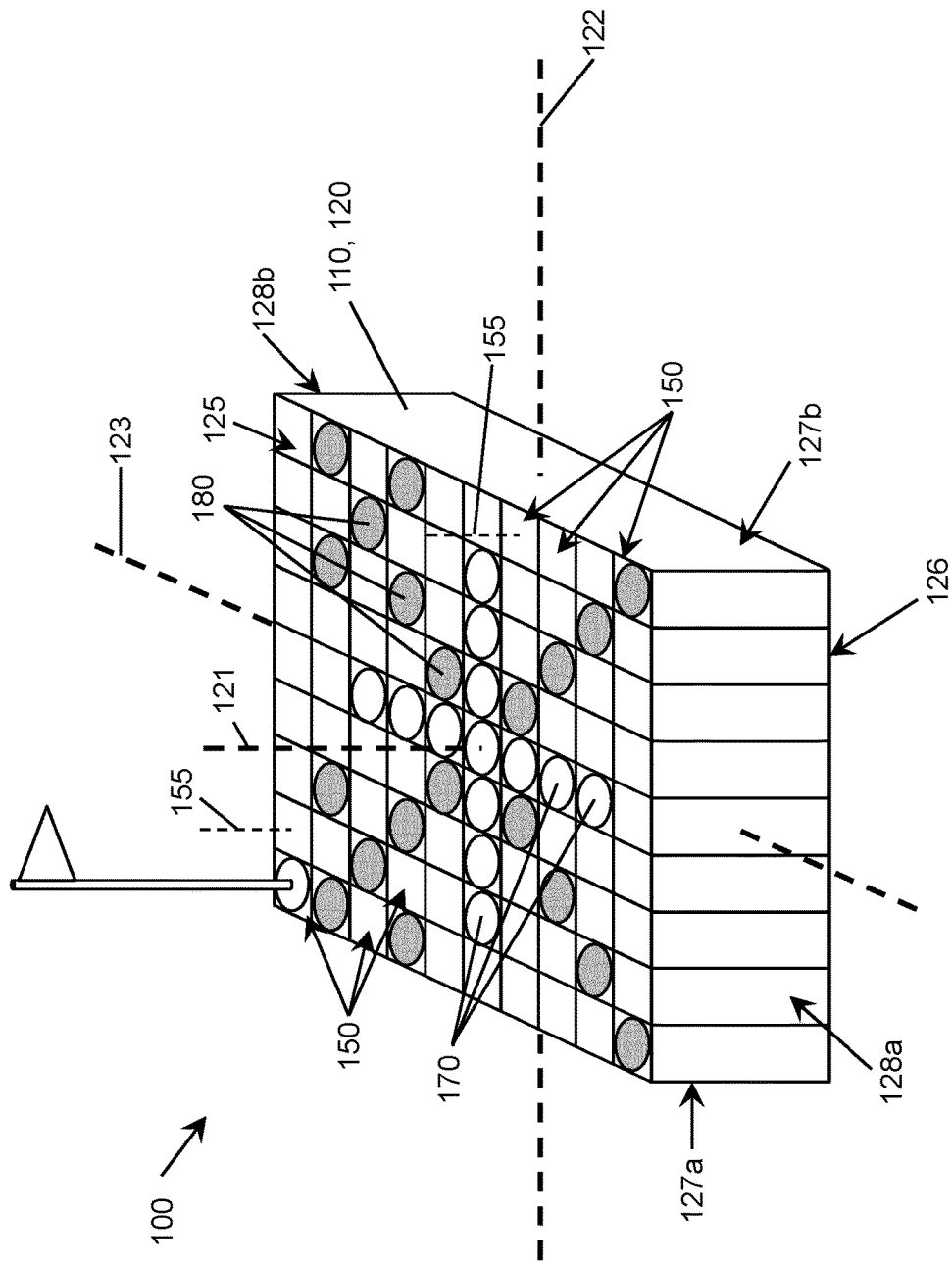
FIG. 2 is a schematic, perspective view of one of the seismic node assemblies of FIG. 1.
Figure 3:
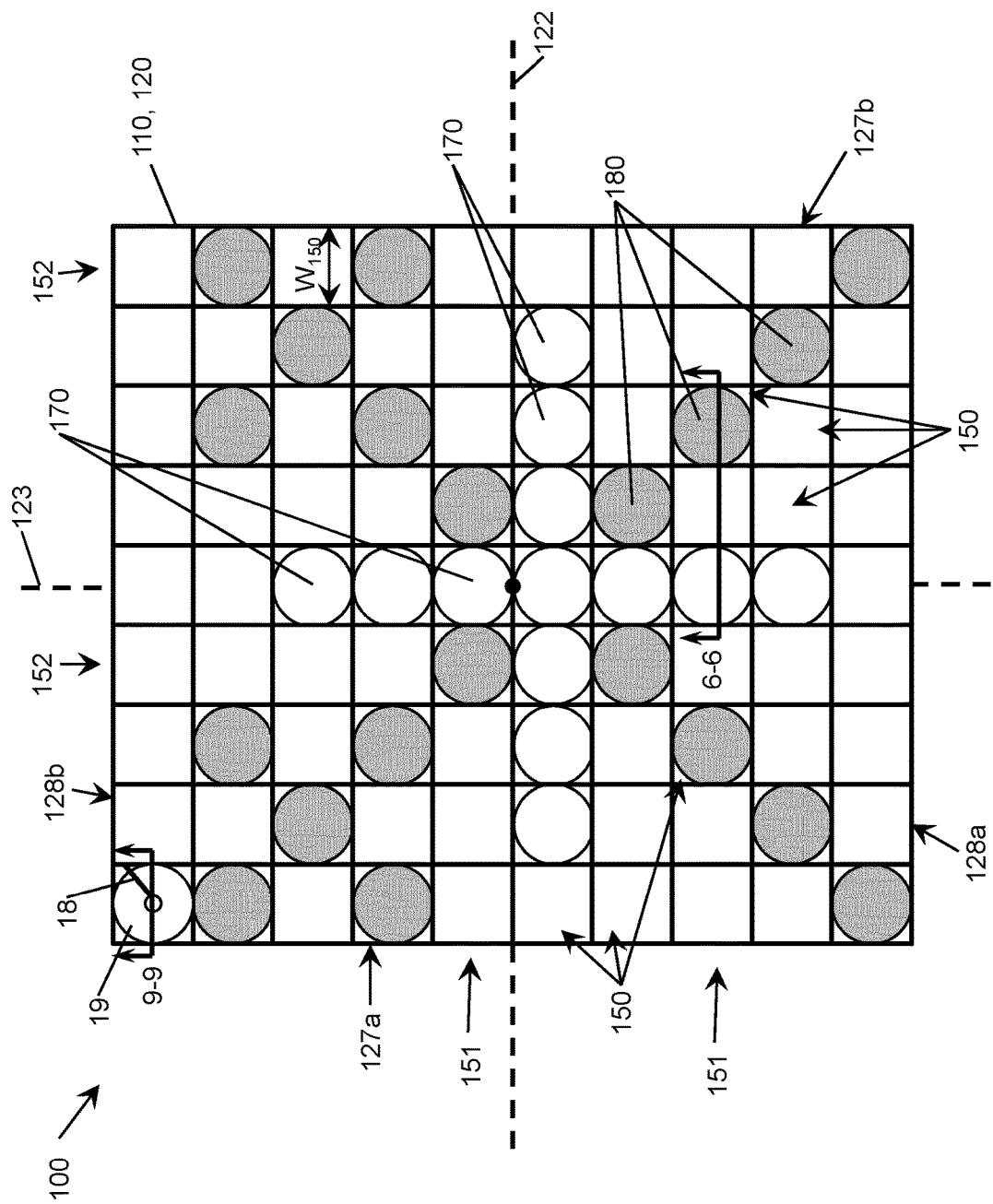
FIG. 3 is a top view of the seismic node assembly of FIG. 2.
Figure 6:
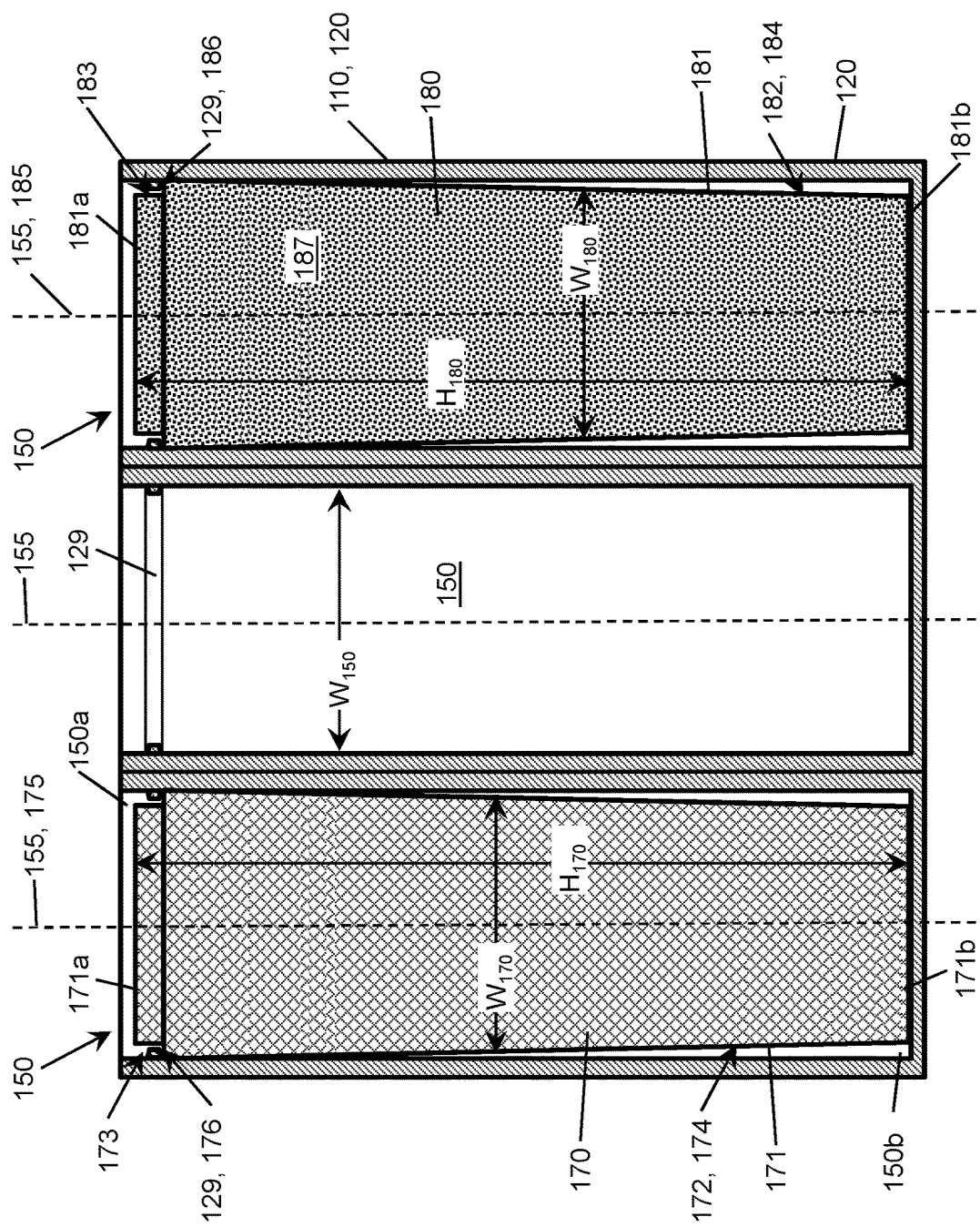
FIG. 6 is a partial cross-sectional side view of the seismic node assembly of FIG. 3 taken along section 6-6 of FIG. 3 and illustrating one seismic node and one weight blank releasably seated in a corresponding receptacle of the seismic node holding device.
Figure 7:
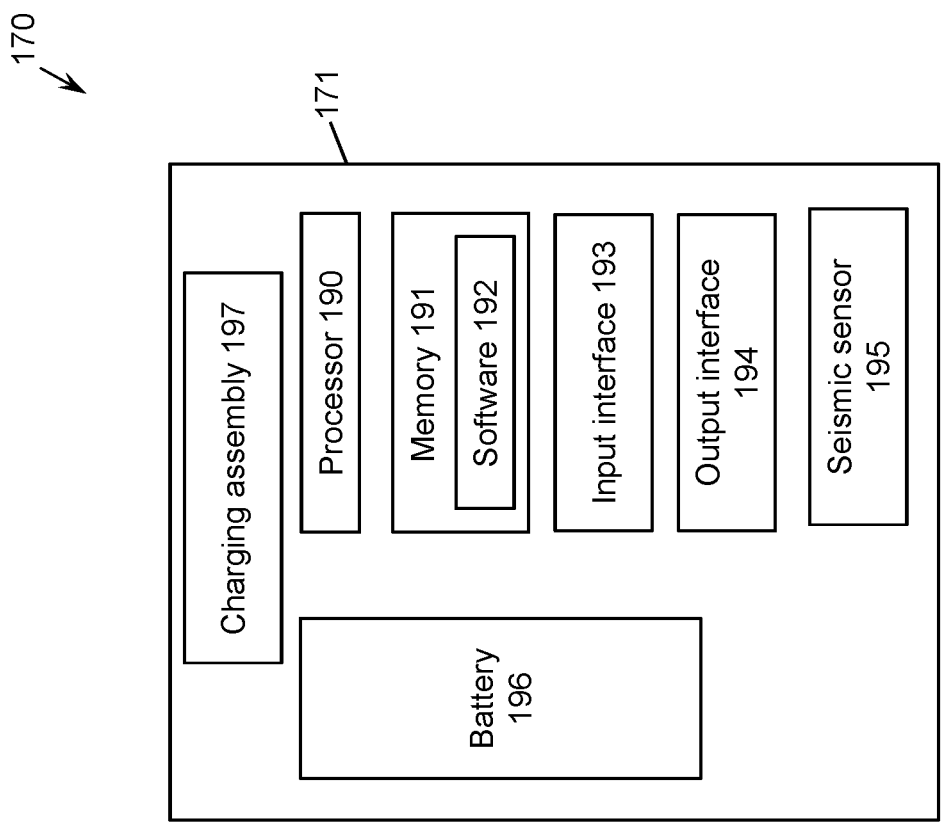
Figure 8:
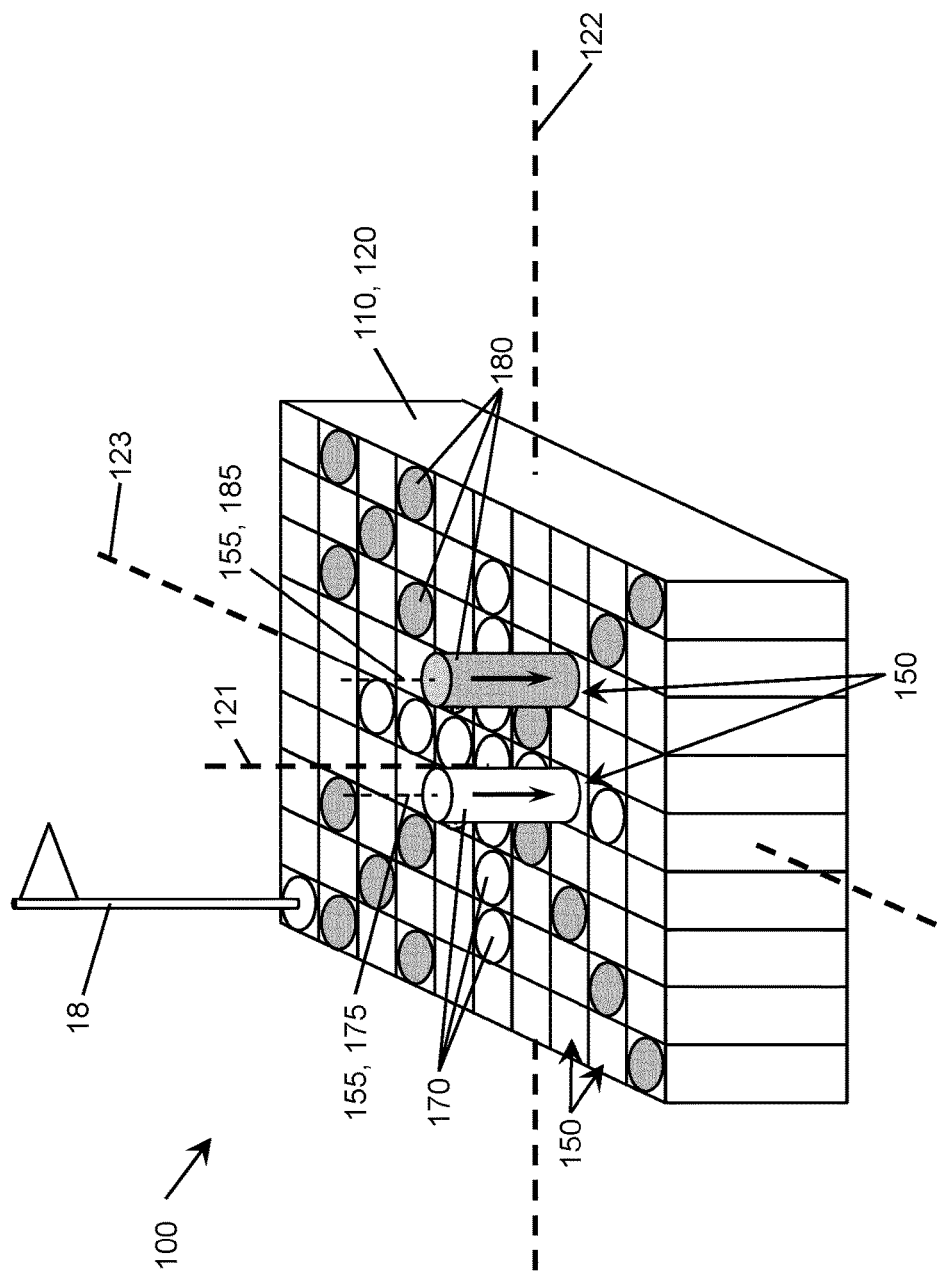
Figure 9:
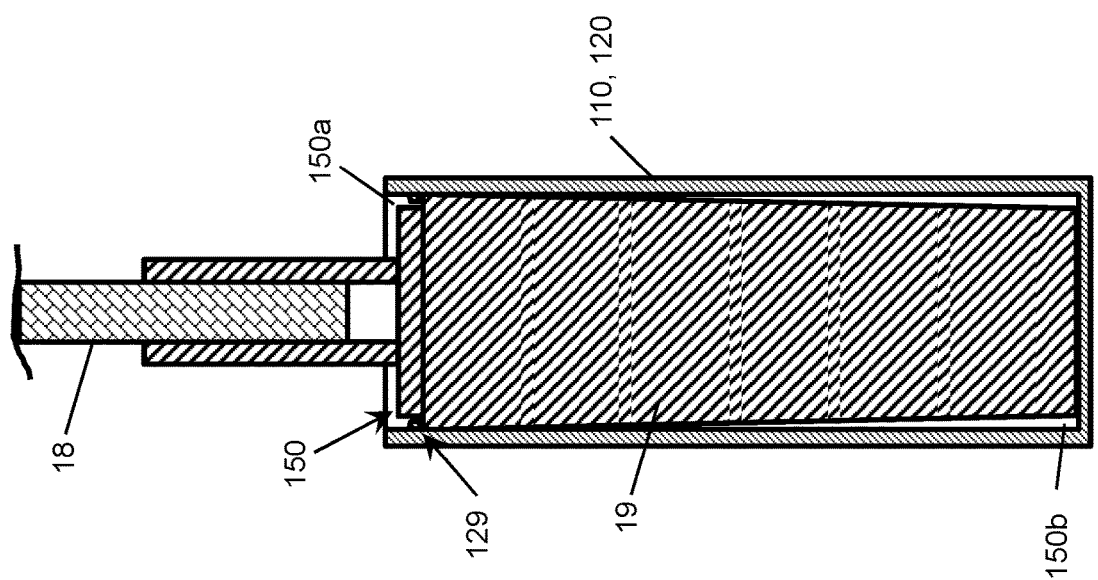
Figure 10:
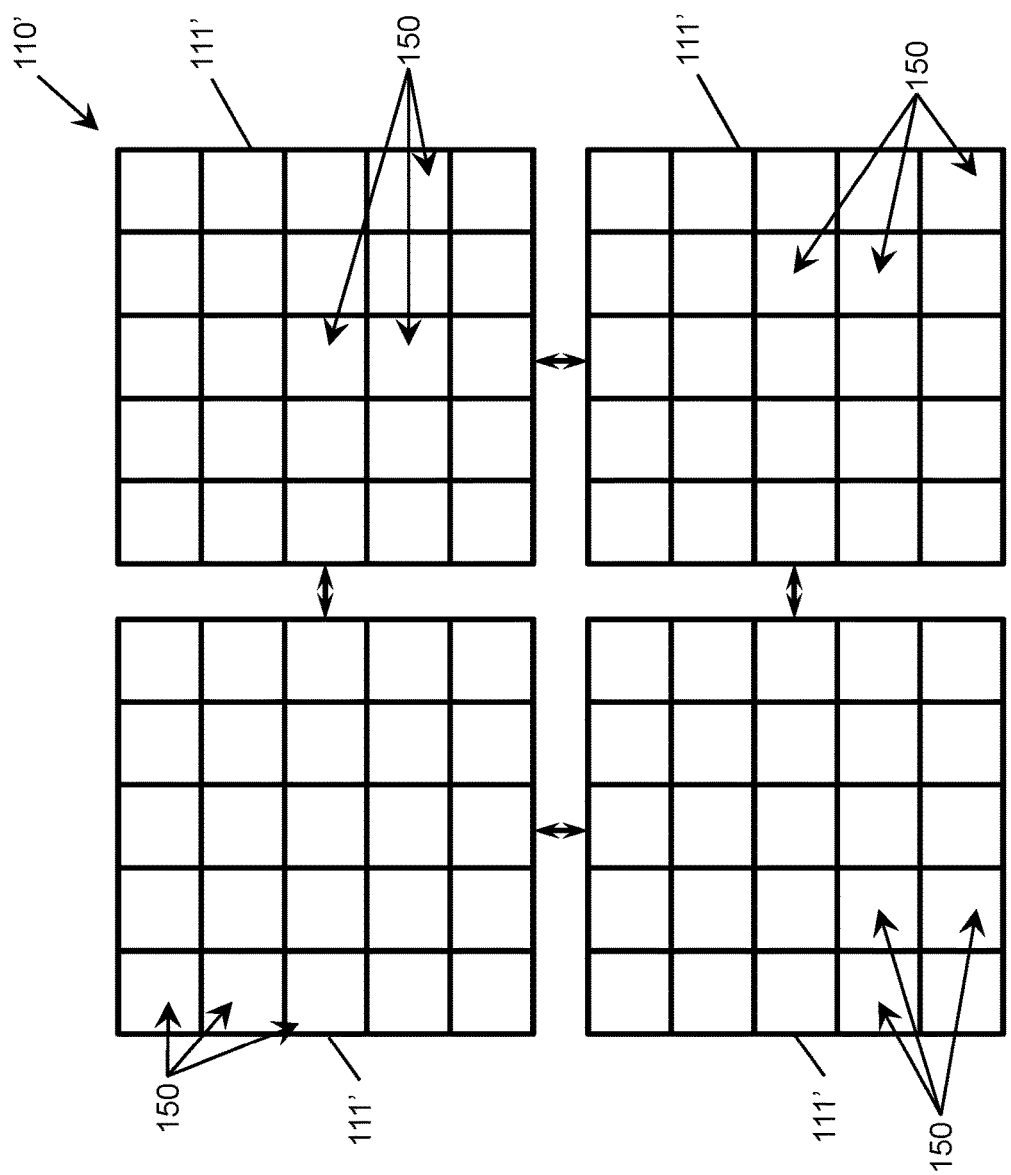
Figure 11:
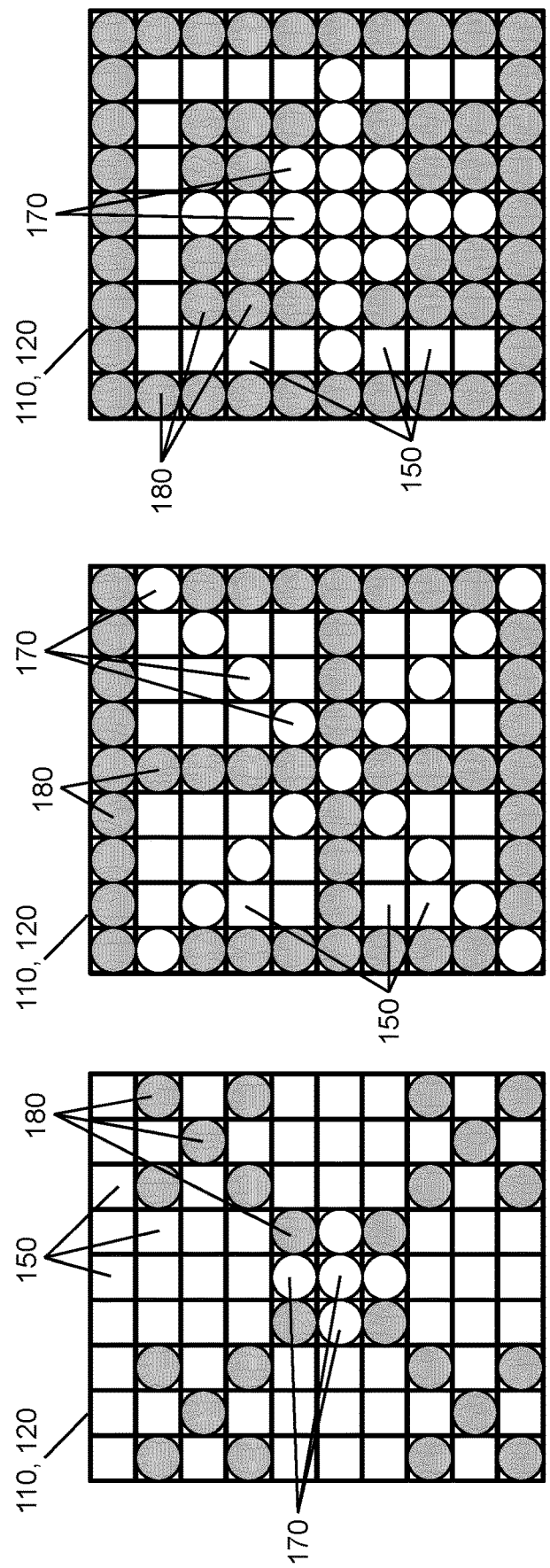
Figure 12:
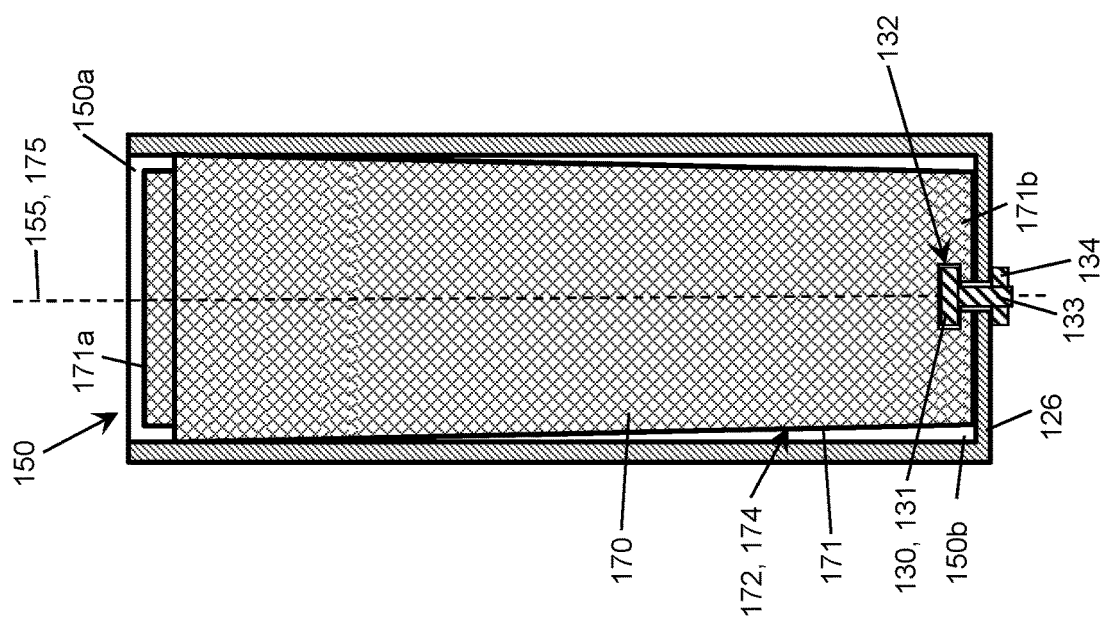
Figure 13:
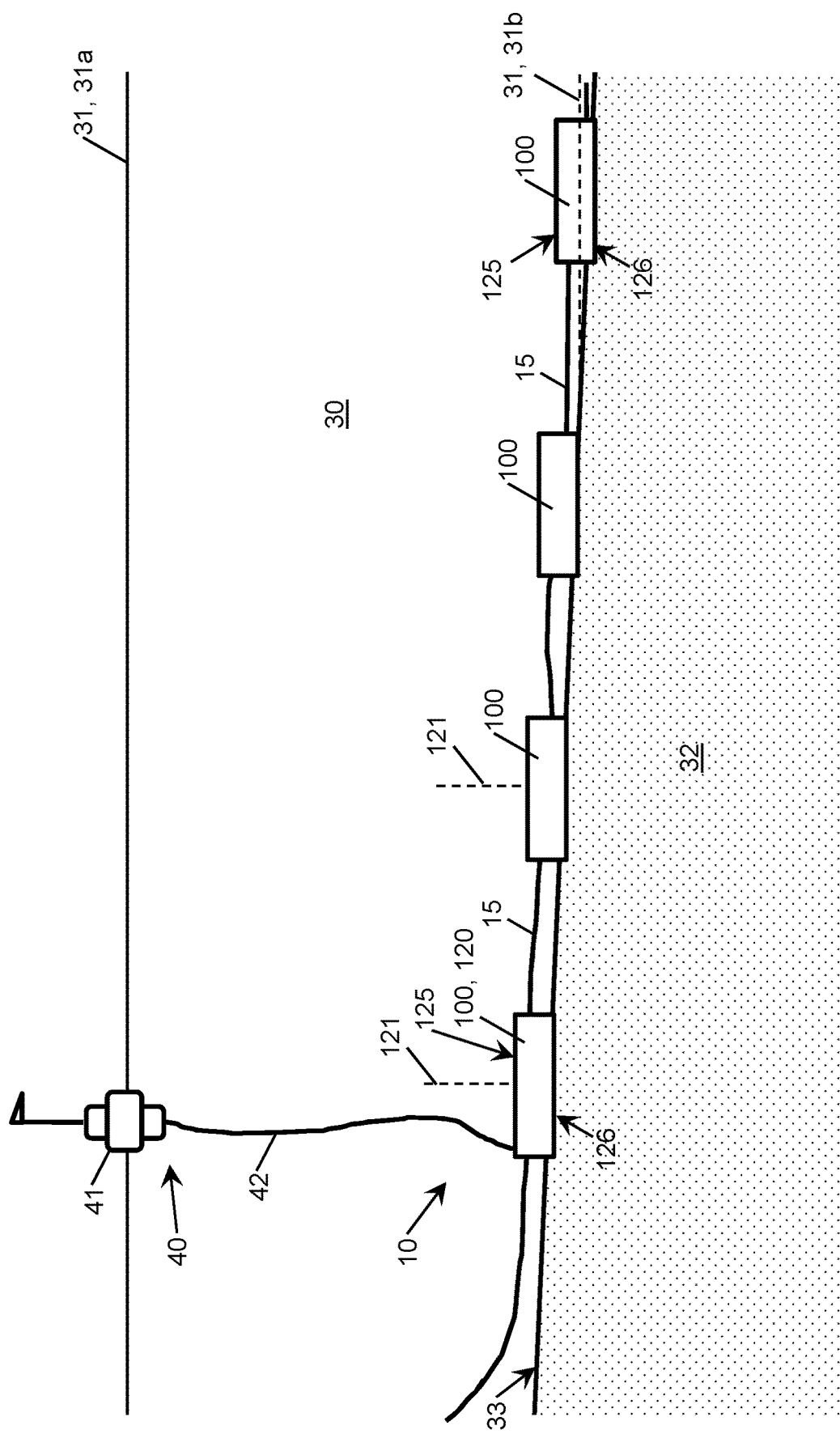
Figure 14:
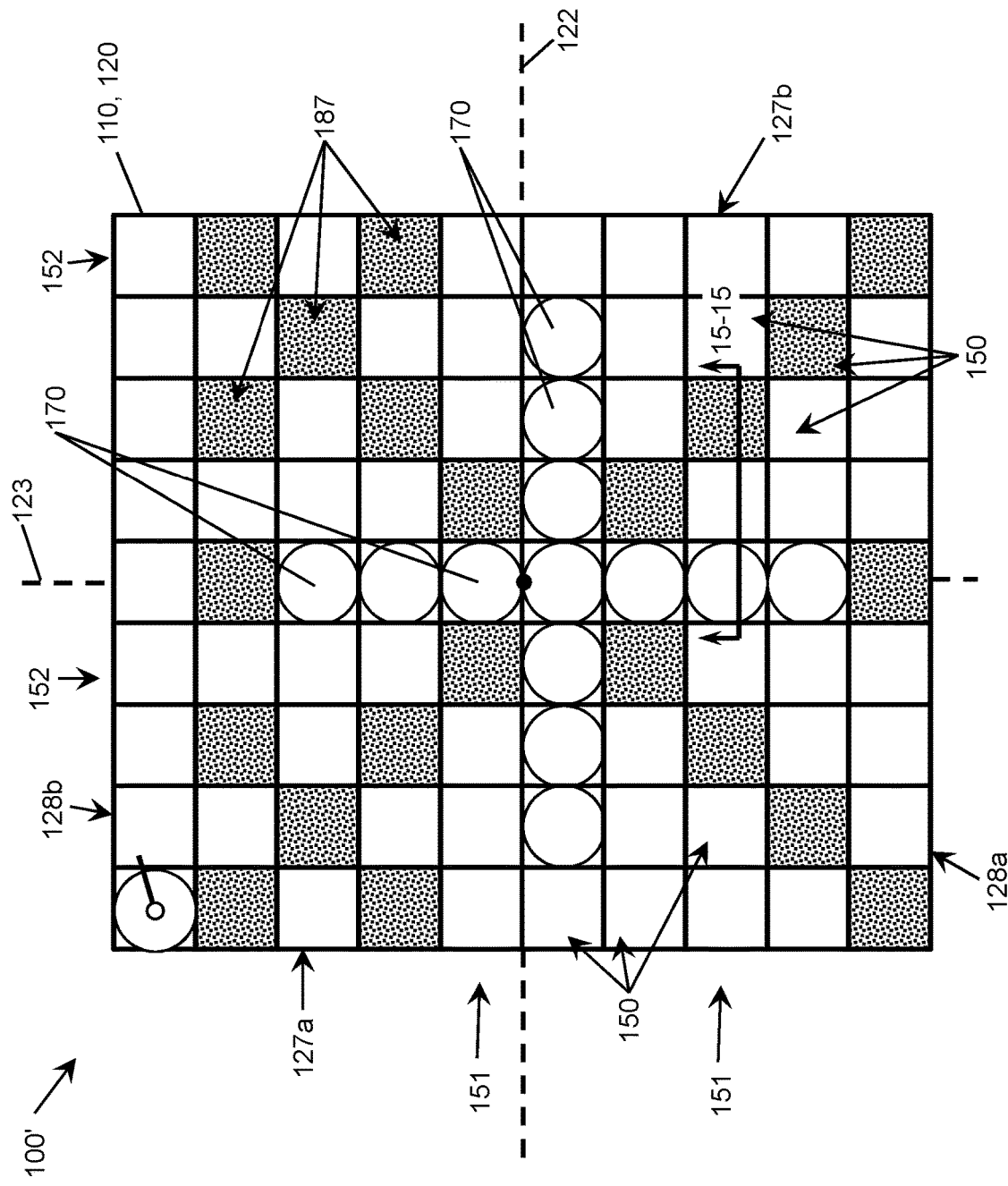
Figure 15:
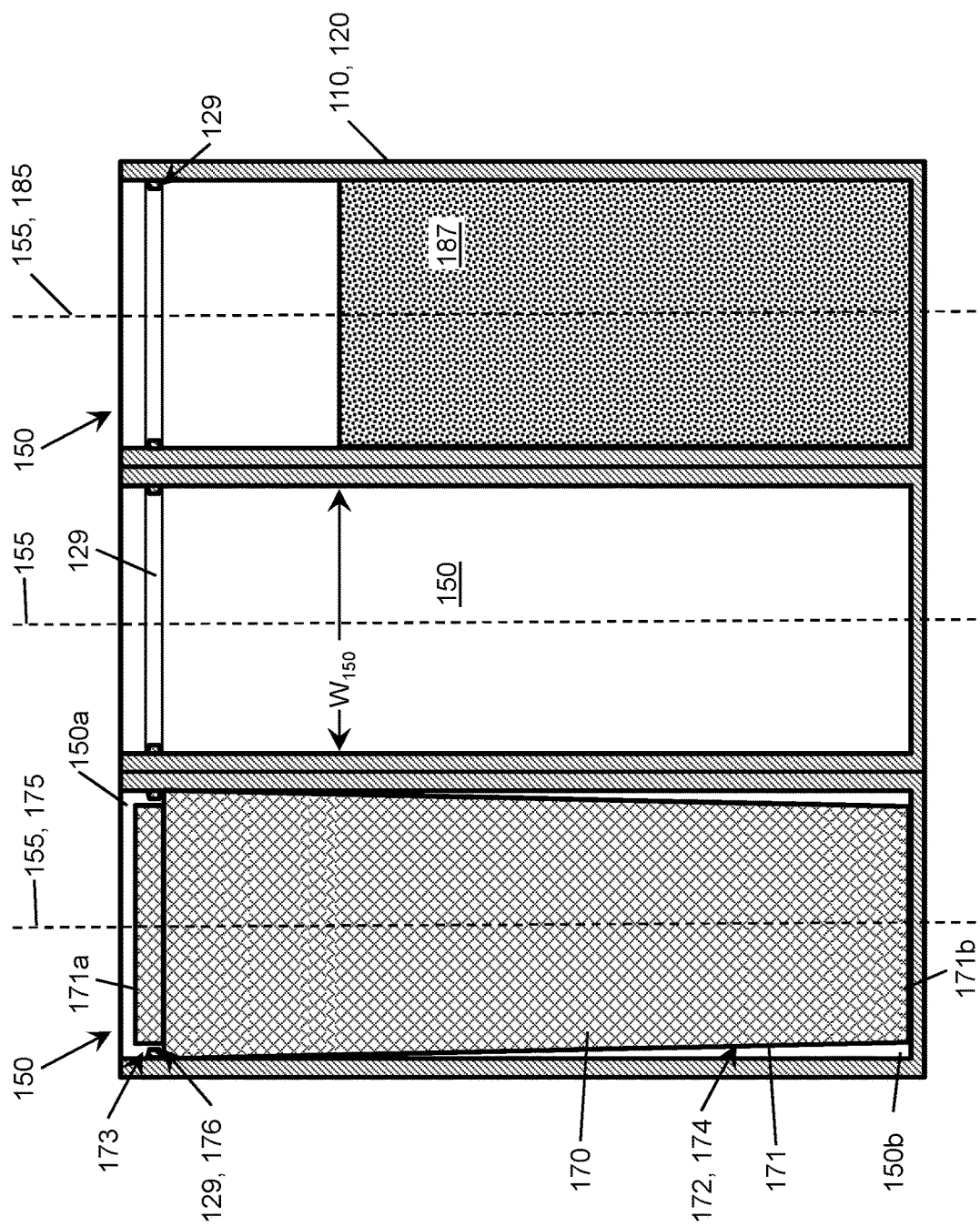
Figure 16:
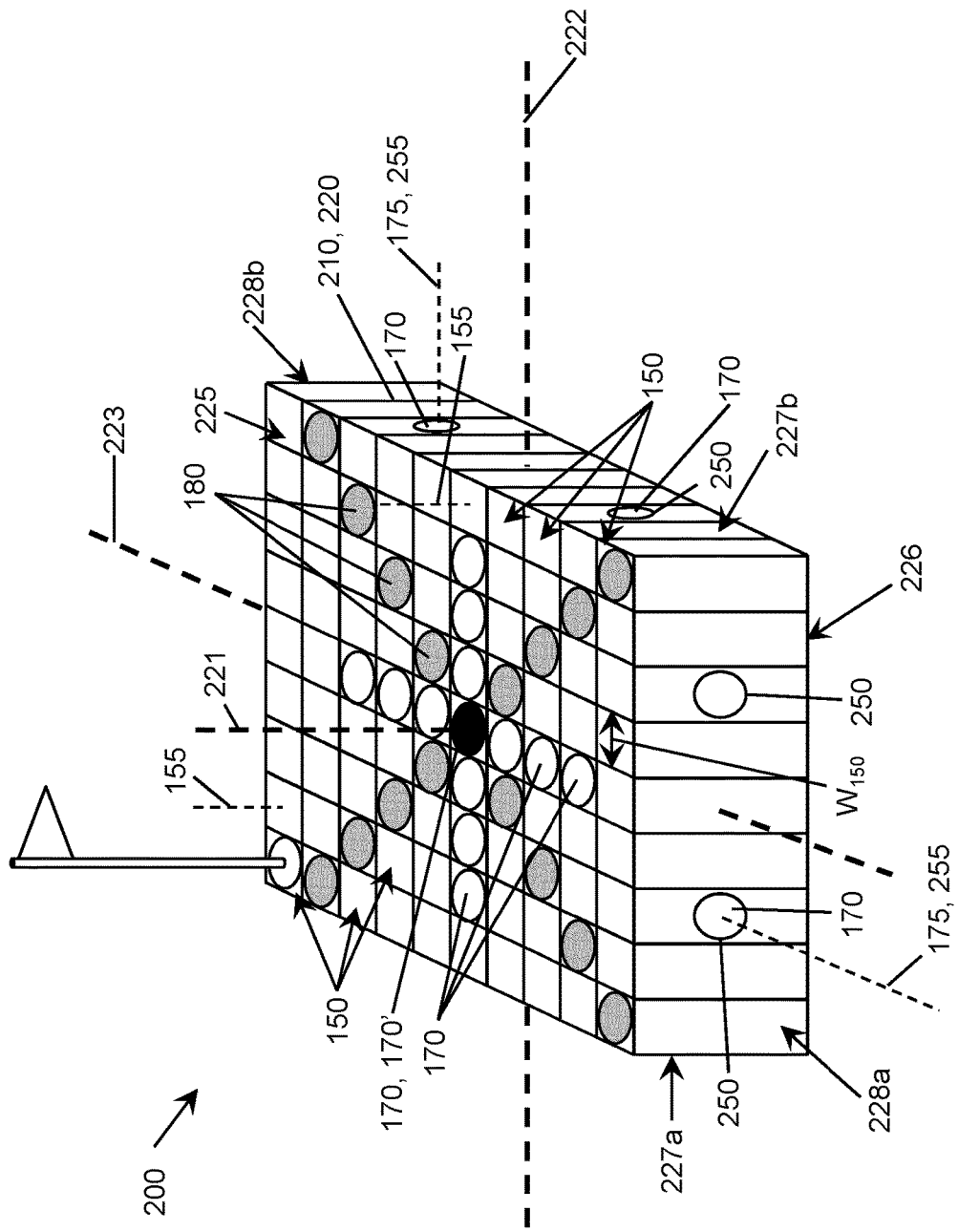
Figure 17:
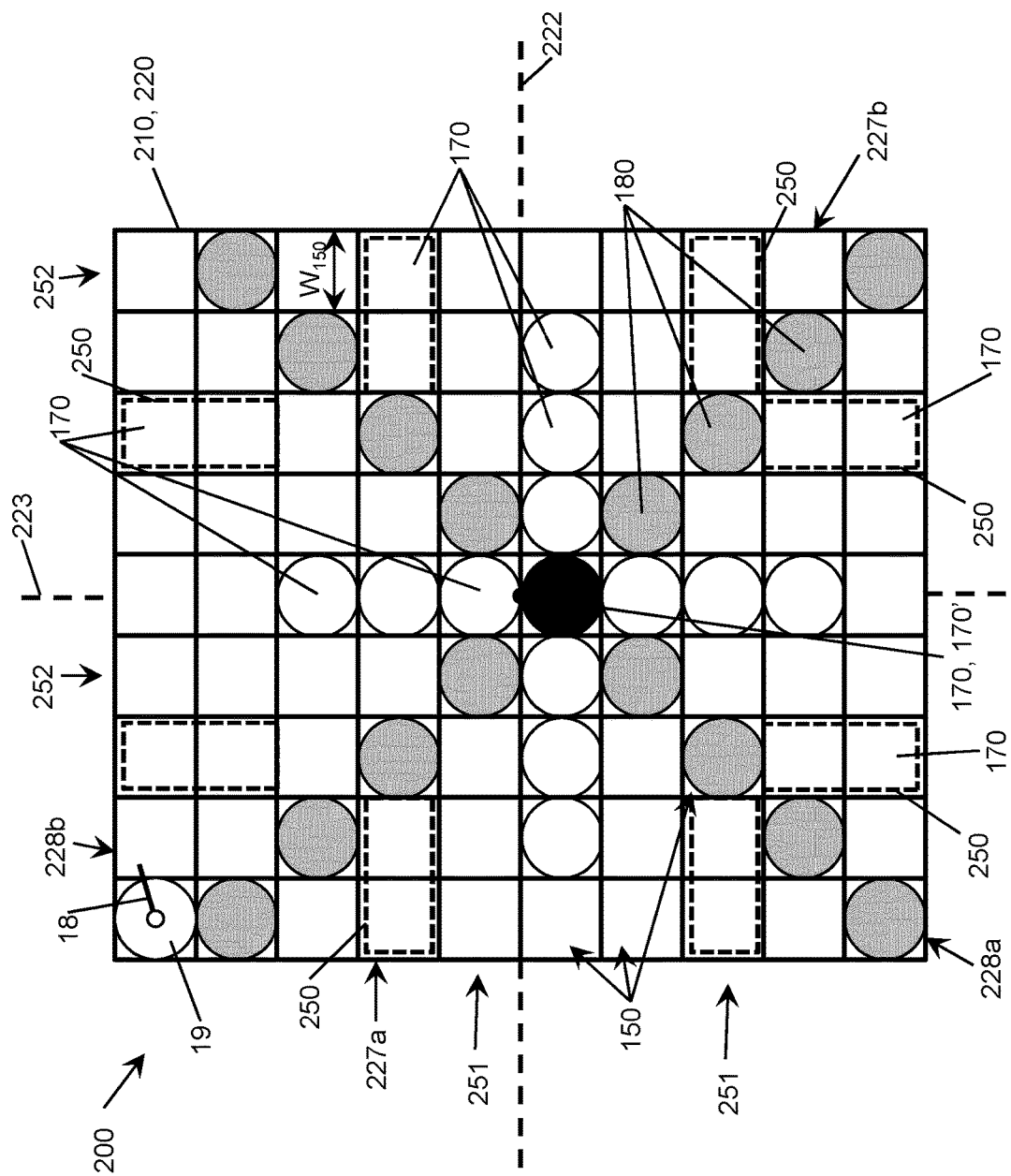
Figure 18:
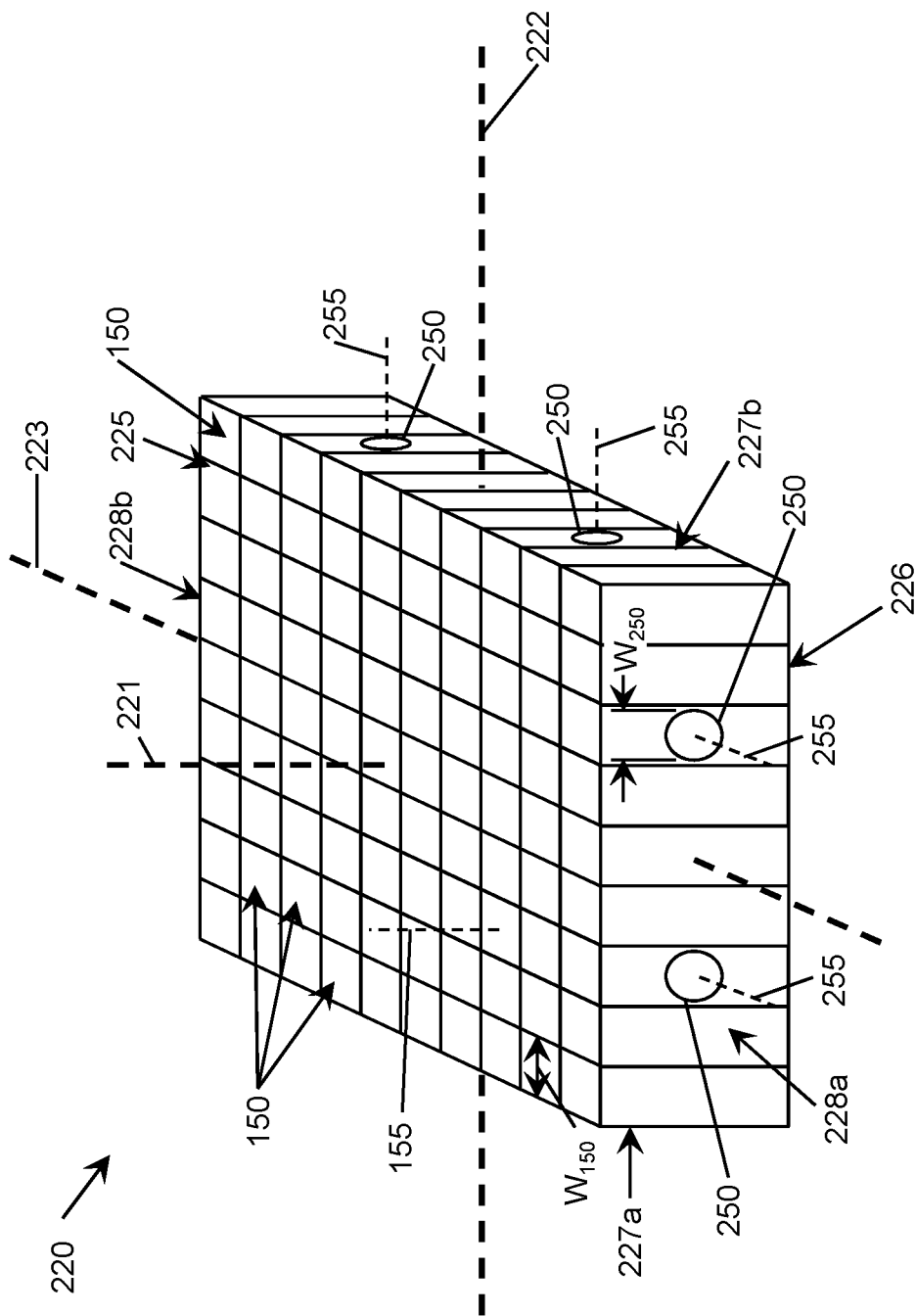
Figure 19:
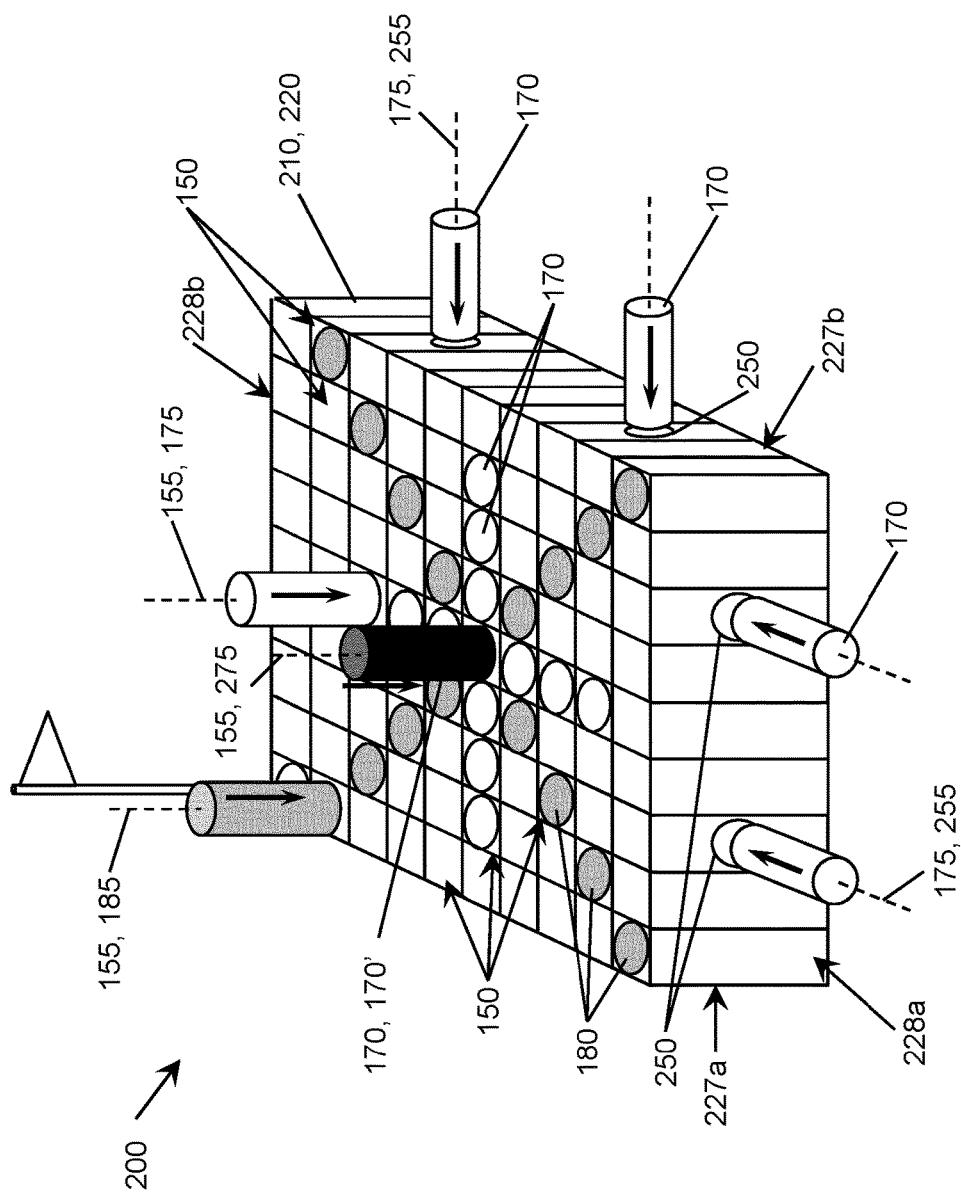
Figure 20:
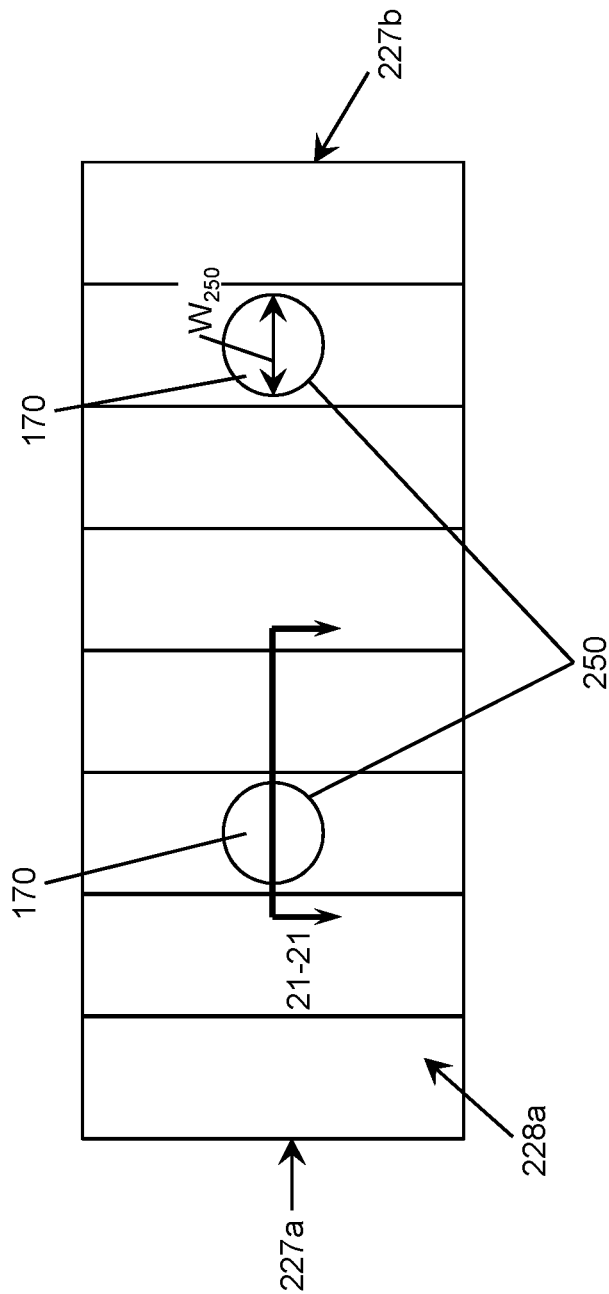
Figure 21:
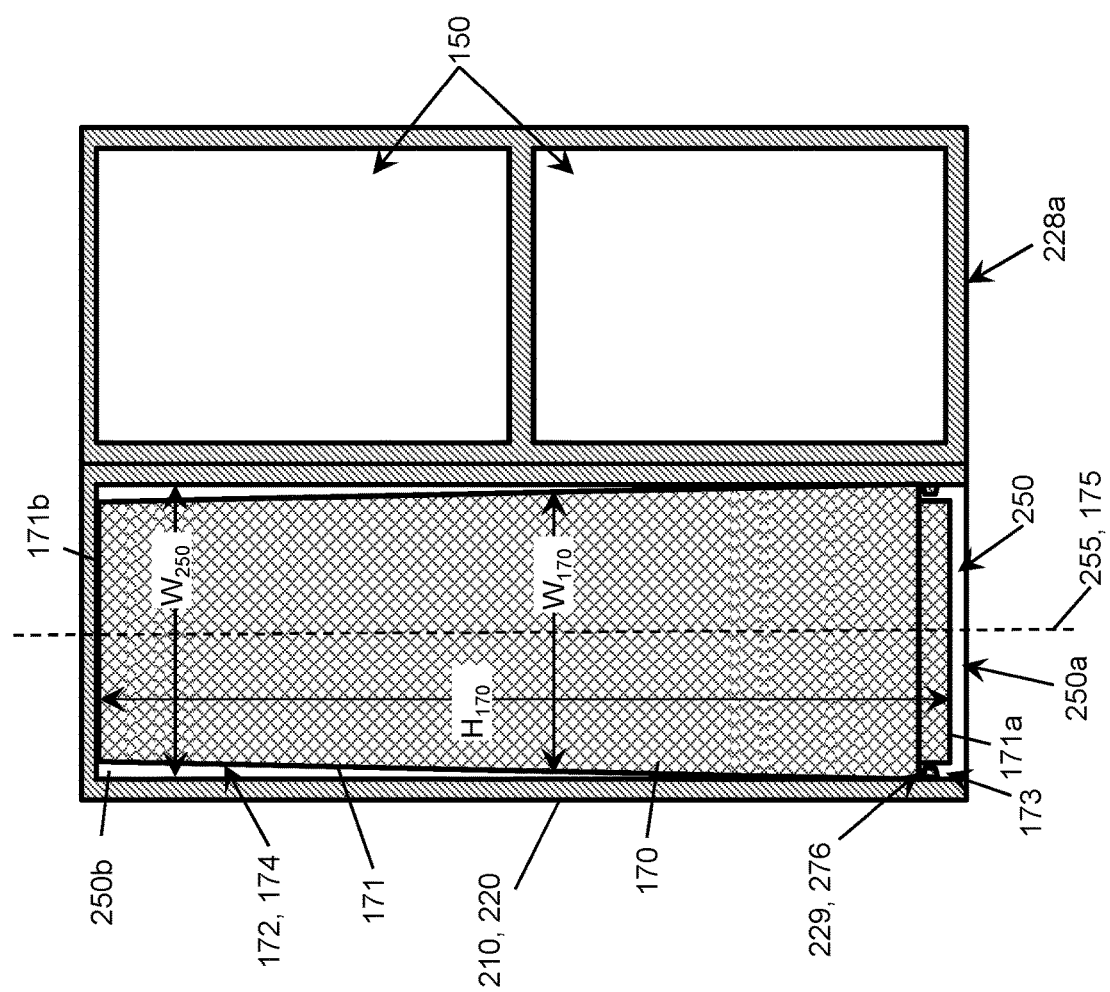
Figure 22:
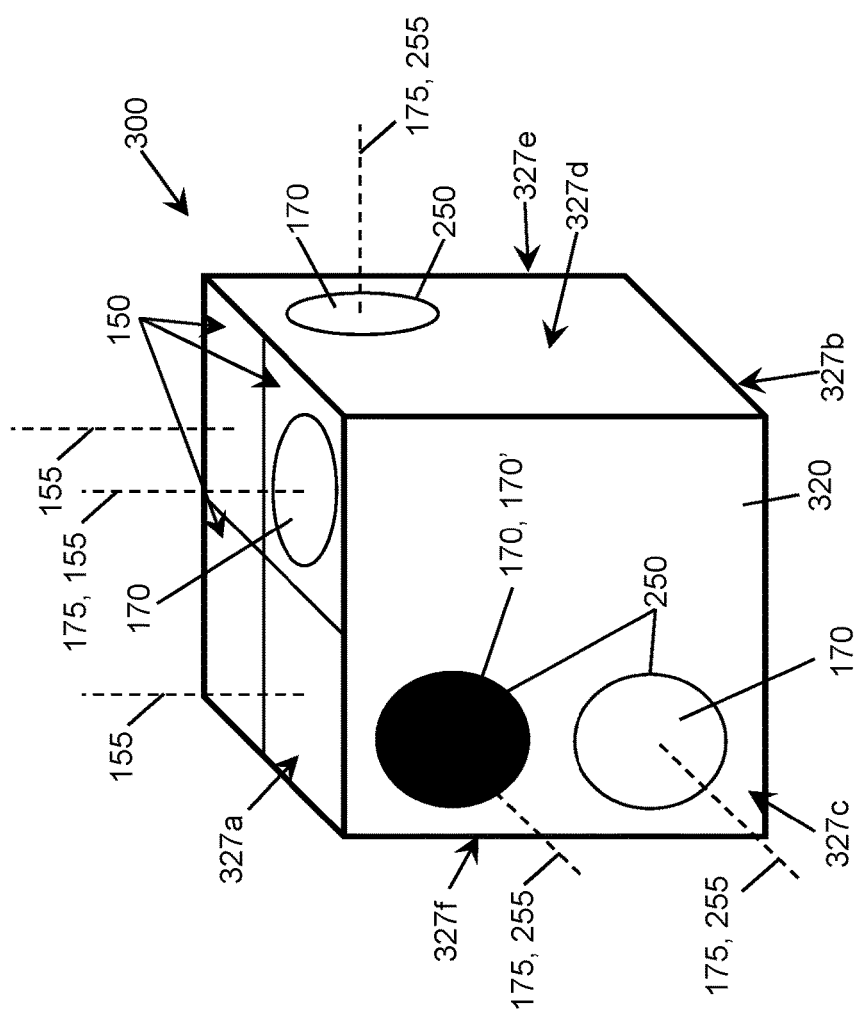
Figure 23:
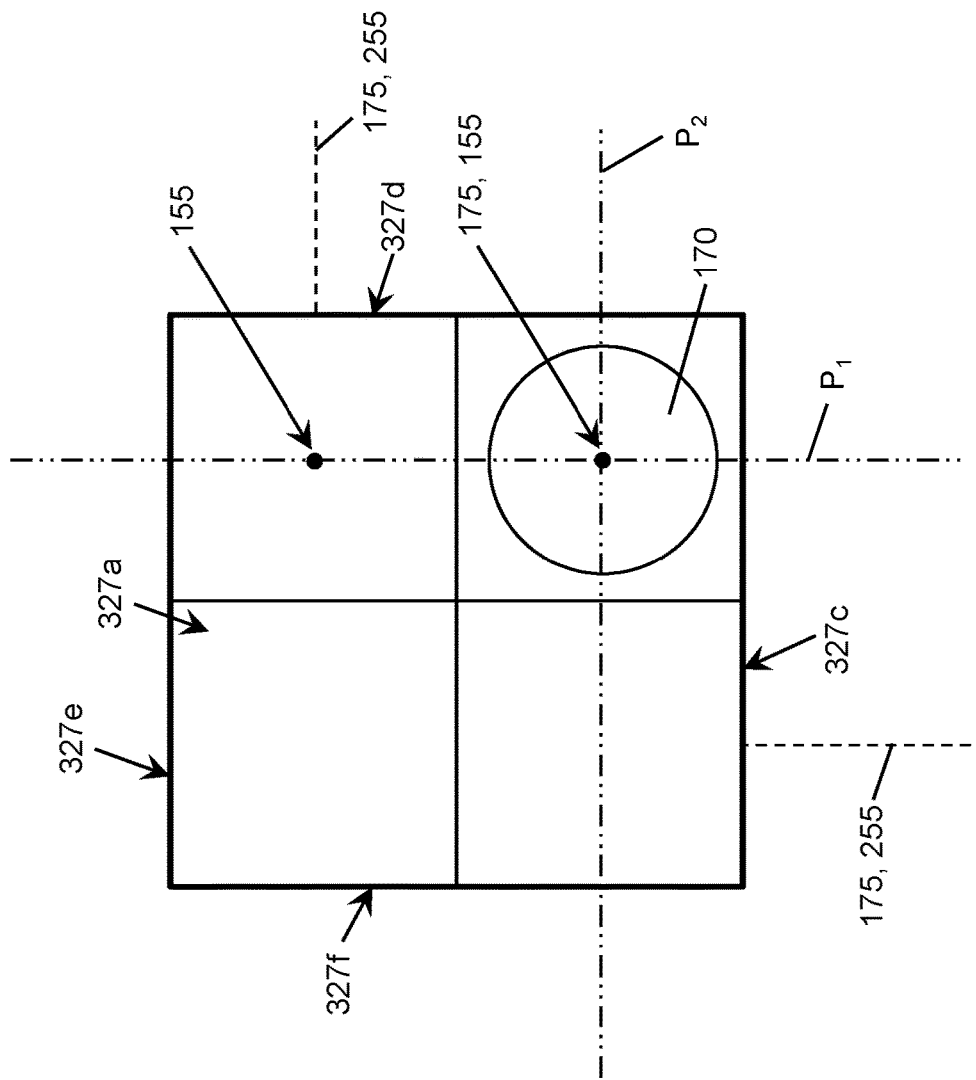

FIG. 7 is a schematic view of one of the seismic nodes of the seismic node assembly of FIG. 3;

FIG. 8 is a schematic, perspective view of the seismic node assembly of FIG. 2 illustrating the loading of the exemplary seismic node and the exemplary weight blank of FIG. 6 into corresponding receptacles of the seismic node holding device;

FIG. 9 is a partial cross-sectional side view of the seismic node assembly of FIG. 2 taken along section 9-9 of FIG. 3 and illustrating the locating device releasably seated in the corresponding receptacle of the seismic node holding device;

FIG. 10 is a top view an embodiment of a seismic node holding device for a seismic node assembly in accordance with principles described herein;

FIGS. 11A-11C are top views of embodiments of seismic node assemblies in accordance with principles described herein and illustrating alternative layouts and arrangements of seismic nodes and weight blanks in corresponding receptacles of seismic node holding devices;

FIG. 12 is a partial cross-sectional side view of an embodiment of a seismic node assembly illustrating one seismic node releasably seated in corresponding receptacle of the seismic node holding device;

FIG. 13 is a schematic side view of an embodiment of a seismic acquisition system in accordance with principles described herein for measuring and recording seismic signals during a seismic survey;

FIG. 14 is a top view of an embodiment of a seismic node assembly in accordance with principles described herein;

FIG. 15 is a partial cross-sectional view of the seismic node assembly of FIG. 14 taken along section 15-15 of FIG. 14;

FIG. 16 is a perspective view of an embodiment of a seismic node assembly in accordance with principles described herein;

FIG. 17 is a top view of the seismic node assembly of FIG. 16;

FIG. 18 is a perspective view of the seismic node holding device of FIG. 16;

FIG. 19 is a perspective view of the seismic node assembly of FIG. 16 illustrating the loading of two exemplary seismic nodes and one exemplary weight blank of FIG. 16 into corresponding receptacles of the seismic node holding device;

FIG. 20 is a front view of the seismic node assembly of FIG. 16;

FIG. 21 is a partial cross-sectional view of the seismic node assembly of FIG. 16 taken along section 21-21 of FIG. 20;

FIG. 22 is a perspective view of an embodiment of a seismic node assembly in accordance with principles described herein; and FIG. 23 is a side view of the seismic node assembly of FIG. 22.

DETAILED DESCRIPTION OF THE PREFERRED EMBODIMENTS

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct engagement between the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As previously described, seismic sensors can be deployed on land or in a marine environment to detect, measure, and record seismic waves. The seismic sensors are typically placed against the ground in a predetermined orientation to detect and measure seismic waves traveling through the subsurface. The seismic sensors are preferably maintained in the predetermined orientation (e.g., vertical orientation for P wave recording, horizontal orientation for S wave recording, etc.) and in firm contact with the ground during the survey to ensure communication of seismic waves through the subsurface directly to the seismic sensors, minimize noise, and enable reliable processing of the seismic wave measurements to ultimately map the subsurface.

In general, seismic surveys can be conducted on land or offshore (i.e., a marine environment) to map the subsurface. In addition, seismic surveys can be performed in "transition zones," which are geographic regions near a body of water that are in less than a maximum of about 50 meters of water depth (typically less than a maximum of about 10 meters of water depth) and may transition between periods of being submerged and periods of not being submerged. From a seismic surveying perspective, transition zones are considered distinct from both offshore "marine" environments and land environments, and generally represent the geographic regions between offshore environment and land environments. Examples of transition zones include beaches, river deltas, coral reefs, shallow lakes, ponds, coastal intertidal zones, swamps, and marshlands.

Transition zones present unique challenges to seismic surveying for a variety of reasons including the periodic submersion of the seismic sensors, unknown and/or variable substrates (e.g., sand, reef, mud, silt, rock, etc.), and relatively high environmental loads. Unknown and/or variable substrates, as well as environmental loads, can negatively impact the ability to securely couple the seismic sensors to the ground and the ability to deploy and maintain the seismic sensors in the desired orientation. Further, the relatively high environmental loads can result in high levels of background noise that manifest as undesirably low measured seismic signal-to-noise ratios. Consequently, conventional approaches for conducting seismic surveys in transitions zones often rely on marine nodes or specialized seismic sensors attached to long spikes that are planted into the substrate of the transition zone. Such marine or specialized seismic sources are typically waterproof, and hence suitable for submersion, and heavy to enhance stability during a seismic survey. However, these types of seismic sources are usually large, bulky, and expensive, which may limit the ability of the surveyor to transport and deploy the large numbers of such seismic sensors that may be needed to address signal-to-noise ratio issues and/or generate more accurate seismic data. In addition, the spikes used to secure the seismic sensors to the substrate may generate vibrational noise that can detrimentally affect the acoustic signals detected and measured. Accordingly, embodiments described herein are directed to devices and methods that can be used to deploy seismic sensors in transition zones and that offer the potential to enhance and maintain stability during the seismic survey, as well as increase the seismic signal-to-noise ratio measured by the seismic sensors. In addition, embodiments described herein can employ relatively small, light-weight, low cost seismic sensors that offer the potential to reduce transport and deployment costs, thereby enabling a greater number of seismic sensors to be deployed. Although embodiments described herein may be can be used in connection with transition zones, it should be understood that they can also be used on land or in offshore subsea environments.

Figure 1:
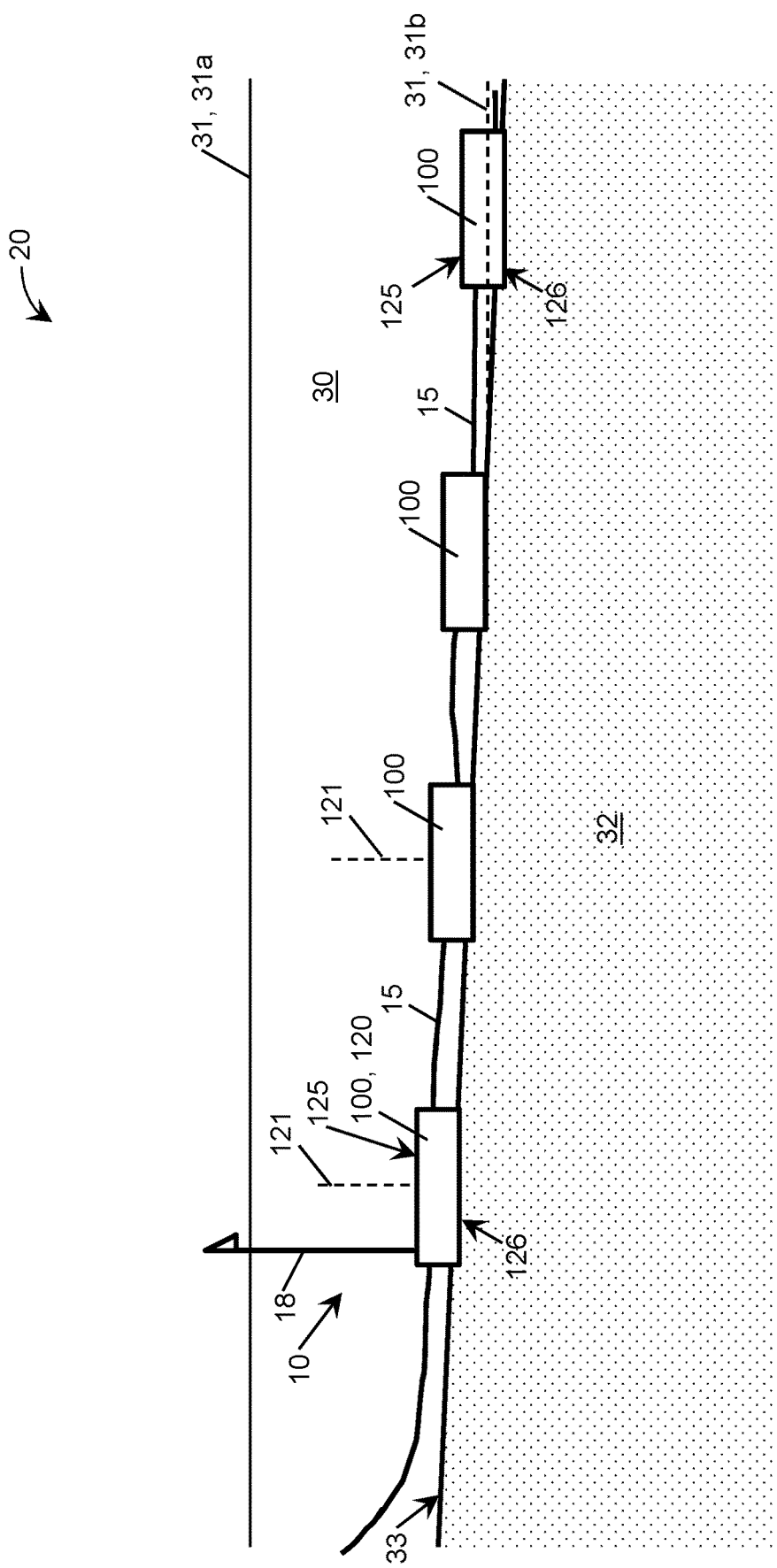
FIG. 1 is a schematic side view of an embodiment of a seismic acquisition system in accordance with principles described herein for measuring and recording seismic signals during a seismic survey in a transition zone.

Referring now to FIG. 1, an embodiment of a seismic acquisition system 10 for performing a seismic survey and acquiring seismic data for mapping a region of the Earth's subsurface is shown. More specifically, in FIG. 1, seismic acquisition system 10 is deployed in a transition zone 20 for mapping the subsurface geology of transition zone 20. As previously described, a "transition zone" is a geographic region near the coast that is in less than a maximum of about 50 meters of water depth (typically less than a maximum of about 10 meters of water depth) and may transition between periods of being submerged and periods of not being submerged. In this embodiment, transition zone 20 is a beach along the coast of a body of water 30. As the tide moves in and out at transition zone 20, the surface 31 of water 30 moves up and down relative to the surface 33 of the ground 32 between a high tide position designated with reference numeral 31a and a low tide position designated with reference numeral 31b (dashed line in FIG. 1). At high tide 31a, the surface 33 of ground 32 and acquisition system 10 are completely submerged below the surface 31 of water 30, and at low tide 32b, acquisition system 10 and the surface 33 of ground 32 are at least partially above the surface 31b of water 30. Thus, transition zone 20 experiences periods of being submerged below the surface 31 of water 30 (e.g., at high tide 31a) and periods being above the surface 31 of water 30 (e.g., at low tide 31b) as the tide moves in and out, respectively.

In this embodiment, seismic acquisition system 10 includes a plurality of spaced apart seismic node assemblies 100 firmly seated against and coupled to the surface 33 of ground 32 and one or more seismic sources (not shown). In general, the seismic sources are activated or triggered to controllably generate seismic waves that travel downward through the ground 32 (and subsurface geology there below), and the seismic waves reflected and communicated back upward from the subsurface geology are detected, measured, and recorded by seismic sensors of seismic node assemblies 100 described in more detail below.

Referring still to FIG. 1, in this embodiment, a flexible retrieval cable or rope 15 extends between each pair of adjacent seismic node assemblies 100 and is coupled to each seismic node assembly 100 for retrieval of seismic node assemblies 100 upon completion of the seismic survey. In addition, an optional locating device 18 extends vertically upward from one of the seismic node assemblies 100 and penetrates the surface 31 of water 30 (at high tide 31a). Locating device 18 can be used by the surveyor to locate the seismic node assemblies 100 for retrieval or other purposes during or after the seismic survey. In other embodiments, the seismic node assemblies (e.g., seismic node assemblies 100) are not coupled together with a cable or rope (e.g., rope 15) and are separately and independently retrieved. As will be described in more detail below, in other embodiments, different types of locating devices other than locating device 18 may be employed to locate the seismic node assemblies for retrieval.

Referring now to FIGS. 2 and 3, one seismic node assembly 100 of seismic acquisition system 10 is shown. Although one seismic node assembly 100 is shown in FIG. 2, it is to be understood the other seismic node assemblies 100 of system 10 are generally the same. In this embodiment, seismic node assembly 100 includes a device or tray 110, a plurality of seismic sensors or nodes 170 removably seated in and coupled to device 110, and a plurality of weight blanks 180 removably seated in and coupled to device 110. Device 110 is configured to hold one or more seismic nodes 170 during a seismic survey, and thus, may also be referred to herein as a tray, a seismic node holding device, or device for holding one or more seismic nodes. For purposes of clarity and further explanation, seismic nodes 170 are illustrated in the color white in the figures, whereas weight blanks 180 are illustrated in the color grey in the figures.

Figure 4:
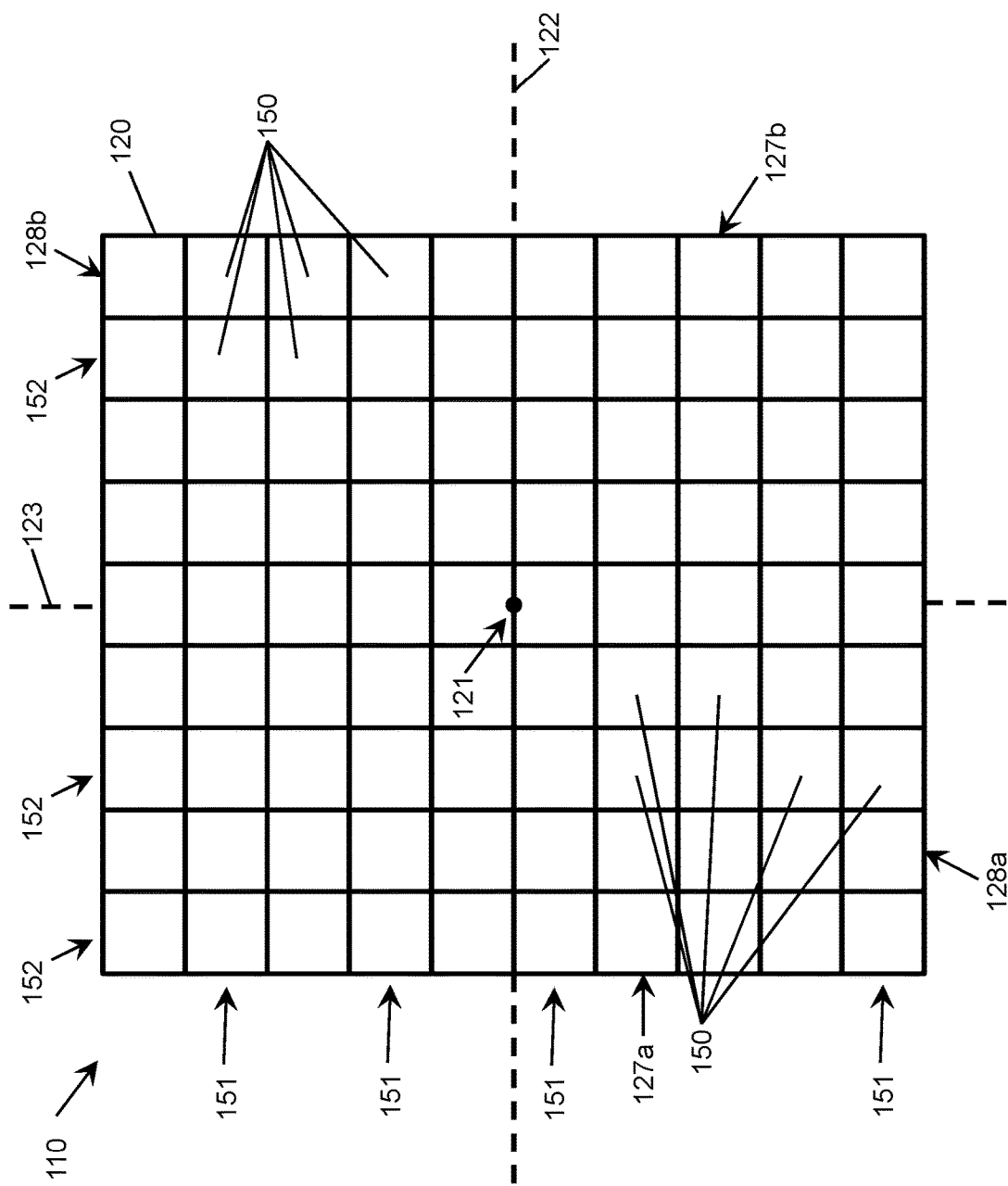
FIG. 4 is a top view of the seismic node holding device of FIG. 2.

Referring now to FIGS. 2-4, seismic node holding device 110 includes a body 120 and a plurality of receptacles 150 in body 120. In this embodiment, body 120 has a rectangular prismatic geometry and may be described as having an orthogonal coordinate axis system including a vertically oriented central axis 121, a horizontally oriented central axis 122 that intersects and is perpendicular to axis 121, and a horizontally oriented central axis 123 that intersects and is perpendicular to both axes 121, 122. In addition, body 120 has an outer surface including a top side 125, a bottom side 126 oriented parallel to top side 125, a pair of parallel, lateral sides 127a, 127b, and a pair of parallel, front and rear sides 128a, 128b, respectively. As shown in FIG. 1, seismic node assemblies 100 are deployed in transition zone 20 with axis 121 oriented vertically, top side 125 facing upward away from the ground 32, and bottom side 126 facing downward and seated firmly against the surface 33 of the ground 32. However, seismic node holding device 110 can be rotated about axis 121 as desired during deployment, and thus, the use of "lateral" to describe sides 127a, 127b, and "front" and "rear" to describe sides 128a, 128b is for convenience and descriptive purposes, and should not be interpreted as limiting the particular locations of sides 127a, 127b, 128a, 128b during deployment in transition zone 20 for performing a seismic survey.

Top side 125 and bottom side 126 face upward and downward, respectively, away from each other and are disposed in parallel horizontal planes oriented perpendicular to axis vertical 121 and parallel to axes 122, 123. Lateral sides 127a, 127b face to the right and left, respectively, away from each other and are disposed in parallel vertical planes oriented perpendicular to axis 122 and parallel to axes 121, 123. Front and rear sides 128a, 128b face forward and backward, respectively, away from each other and are disposed in parallel vertical planes oriented perpendicular to axis 123 and parallel to axes 121, 122. Sides 125, 126 extend horizontally and axially relative to axis 122 between sides 127a, 127b, and extend horizontally and axially relative to axis 123 between sides 128a, 128b. Sides 127a, 127b extend vertically and axially relative to axis 121 between sides 125, 126, and extend horizontally and axially relative to axis 123 between sides 128a, 128b. Sides 128a, 128b extend vertically and axially relative to axis 121 between sides 125, 126, and extend horizontally and axially relative to axis 122 between sides 127a, 127b. As will be described in more detail below, in this embodiment, receptacles 150 extend through top side 125. However, each of the remaining sides 126, 127a, 127b, 128a, 128b is generally formed of a continuous sheet or panel of material without any through holes or apertures. In other embodiments, one or more of sides 126, 127a, 127b, 128a, 128b may include holes or apertures.

Although each side 125, 126, 127a, 127b, 128a, 128b is described as being disposed in a plane in this embodiment, and hence, each side 125, 126, 127a, 127b, 128a, 128b is generally planar, in other embodiments, the sides of the body (e.g., sides 125, 126, 127a, 127b, 128a, 128b of body 120) may have other non-planar geometries (e.g., concave, convex, etc.). In addition, although body 120 has a rectangular prismatic geometry with six sides 125, 126, 127a, 127b, 128a, 128b in this embodiment, in other embodiments, the body (e.g., body 120) may have a different three-dimensional geometry such as pyramidal, conical, parallelpiped, spherical, cylindrical, etc. and/or a different number of sides.

Body 120 is made of a rigid or substantially rigid material that is suitable for use in a marine environment. Examples of suitable materials include polymers, polyvinyl chloride (PVC), composites, stainless steel, aluminum, concrete (conventional or biodegradable), and the like. In some embodiments, body 120 is made of a biodegradable material that breaks down over a period of time in cases where seismic node holding device 110 is left behind.

Referring now to FIGS. 2-4 and 6, receptacles 150 extend vertically (i.e., axially relative to central axis 121) from top side 125 toward bottom side 126. Thus, each receptacle 150 has a central or longitudinal axis 155 oriented parallel to axis 121. Receptacles 150 extend through top side 125 but do not extend through bottom side 126. Thus, each receptacle 150 may be described as having an open, first or upper end 150a at top side 125 and a closed, second or lower end 150b adjacent bottom side 126. In this embodiment, each receptacle 150 is the same, and in particular, has a rectangular prismatic shape with a square cross-section taken in any plane oriented perpendicular to axis 121. Thus, each receptacle 150 has a uniform or constant minimum width $W_{150}$ measured parallel to axis 122 or axis 123.

Referring briefly to FIGS. 3 and 4, in this embodiment, receptacles 150 are arranged in body 110 in a plurality of parallel rows 151 extending axially relative to axis 122 between lateral sides 127a, 127b and a plurality of parallel columns 152 extending axially relative to axis 123 between front and rear sides 128a, 128b. Thus, rows 151 and columns 152 are generally oriented perpendicular to each other. In this embodiment, body 120 includes ten rows 151 and nine columns 152; each column 152 includes ten receptacles 150 and each row 151 includes nine receptacles 150, resulting in ninety total receptacles 150. In other embodiments, the receptacles (e.g., receptacles 150) may be arranged in different numbers of rows and columns, the receptacles may be arranged in a pattern that does not include definable rows and/or columns (e.g., an arrangement of concentric rings of receptacles), fewer or more than ninety receptacles may be provided, or combinations thereof.

Figure 5:
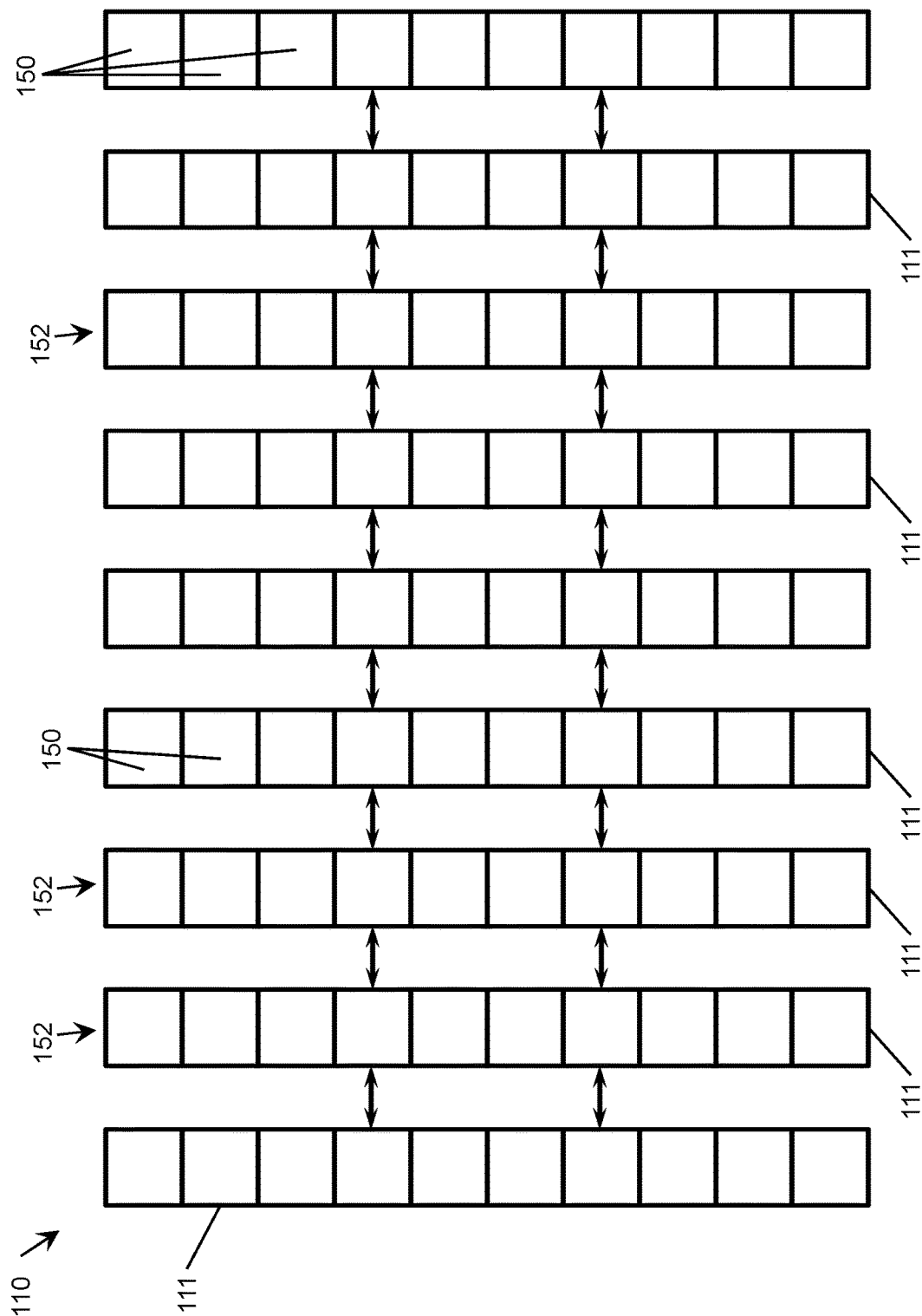
FIG. 5 is an exploded top view of the seismic node holding device of FIG. 4.

Referring now to FIG. 5, in this embodiment, seismic node holding device 110 includes a plurality of discrete magazines 111 that are releasably coupled side-by-side together to form seismic node holding device 110. In particular, each magazine 111 defines one contiguous column 152 of ten receptacles 150, and nine magazines 111 are coupled together to form seismic node holding device 110.

Although nine magazines 111 are coupled in this embodiment, in general, any number of magazines 111 can be releasably coupled together to form a seismic node holding device (e.g., seismic node holding device 110) having the desired number of columns 152 and receptacles 150. For example, four magazines 111 can be coupled together to form a seismic node holding device having four columns 152 of ten receptacles 152 for forty total receptacles 150. Thus, it should be appreciated that forming seismic node holding device 110 with magazines 111 provides the surveyor with flexibility to adjust and vary the size of seismic node holding device 110, the number of receptacles 150, and the arrangement of receptacles 150. Moreover, although each magazine 111 forms a single row 152 of ten receptacles 150 in this embodiment, in other embodiments, the magazines (e.g., magazines 111) that are releasably coupled together to form the seismic node holding device (e.g., seismic node holding device 110) may have other geometries and/or numbers of receptacles (e.g., receptacles 150). For example, FIG. 10 illustrates an embodiment of a seismic node holding device 110' that includes four magazines 111' releasably coupled together. In this embodiment, each magazine 111' includes a generally square five-by-five arrangement of receptacles 150 (twenty-five total receptacles 150), and four magazines 111' are releasably coupled together to form seismic node holding device 110' having one-hundred total receptacles 150 arranged in ten rows 151 and ten columns 152 with each row 151 having ten receptacles 150 and each column 152 having ten receptacles 150.

In general, magazines 111, 111' can be releasably coupled together by any suitable means known in the art. In the embodiments shown in FIGS. 5 and 10, magazines 111, 111' are releasably coupled together via engagement of integral hooks provided on each magazine 111, 111' and mating slots provided on each magazine 111, 111'.

Referring again to FIGS. 2 and 3, as previously described, a plurality of seismic nodes 170 and a plurality of weight blanks 180 are disposed in seismic node holding device 110. More specifically, each receptacle 150 is sized and configured to releasably receive one seismic node 170 or one weight blank 180. Accordingly, each seismic node 170 is releasably seated in one receptacle 150, and each weight blank 180 is releasably seated in one receptacle 150. When seismic nodes 170 and weight blanks 180 are sufficiently seated in receptacles 150, they do not extend from the corresponding receptacles 150.

Seismic nodes 170 detect, measure, and record reflected seismic waves or signals traveling through the ground 32 toward surface 33 during a seismic survey at transition zone 20, whereas weight blanks 180 are provided to firmly couple seismic nodes 170 to the surface 33 and enhance the stability of seismic node assembly 100 in transition zone 20 during seismic surveys. In particular, by increasing the weight of seismic node assembly 100, weight blanks 180 resist environmental loads experienced by seismic node assembly 100 during a seismic survey to maintain a relatively firm and secure coupling between seismic nodes 170 and the ground 32, and maintain the desired position and orientation of seismic node assembly 100. For example, in the embodiment of seismic node assembly 100 shown in FIGS. 2 and 3, the seismic nodes 170 are preferably deployed in a vertical orientation (i.e., with axis 121 vertically oriented) and maintained in that orientation during the seismic survey.

As shown in FIGS. 2 and 3, seismic nodes 170 are arranged in a predetermined pattern or array within receptacles 150 of seismic node holding device 110. In general, the layout of the array of seismic nodes 170 within seismic node holding device 110 that is optimal for a given environment and seismic survey can be determined using techniques known in the art such as decimation analyses. Weight blanks 180 can then be added to particular receptacles 150 in seismic node holding device 110 to obtain a total weight and distribution of weight within seismic node assembly 100 to achieve the firm and secure coupling between seismic nodes 170 and the ground 32, and maintain the desired position and orientation of seismic node assembly 100 during the subsequent seismic survey. It should be appreciated that since weight blanks 180 can be added and removed from seismic node holding device 110 with relative ease, the layout of weight blanks can be varied and adjusted at the point-of-use (i.e., at transition zone 20) during deployment based on the actual, real time conditions at the point-of-use.

As previously described, the particular layout and arrangement of seismic nodes 170 and weight blanks 180 within receptacles 150 of seismic node holding device 110 can be varied depending on a variety of factors including, without limitation, the environmental loads and conditions at transition zone 20, the seismic survey plan (e.g., duration of the seismic survey), etc. Thus, it is to be understood that the particular layout of seismic nodes 170 and weight blanks shown in FIGS. 2 and 3 is exemplary and other layouts may be employed. Alternative exemplary layouts and arrangements of seismic nodes 170 and weight blanks 180 in seismic node holding devices 110 are shown in FIGS. 11A-11C.

Referring now to FIG. 6, seismic nodes 170 and weight blanks 180 are releasably seated and firmly secured within receptacles 150. As shown in FIG. 6 and previously described, when seismic nodes 170 and weight blanks 180 are sufficiently seated in receptacles 150, they do not extend from the corresponding receptacles 150. In this embodiment, each seismic node 170 is the same, each weight blank 180 is the same, the interface between each seismic node 170 and body 120 within receptacle 150 is the same, and the interface between each weight blank 180 and body 120 within receptacle 150 is the same. Accordingly, one seismic node 170 seated in a corresponding receptacle 150 of body 120 and one weight blank 180 seated in a corresponding receptacle 150 of body 120 will be described it being understood the others are the same.

As shown in FIG. 6 and previously described, in this embodiment, each receptacle 150 has a square cross-sectional geometry with a minimum width $W_{150}$ that is constant between ends 150a, 150b. In this embodiment, the inner surface of body 120 defining receptacle 150 includes a flange or lip 129 that extends radially inward (relative to axis 155) into each receptacle 150 proximal upper end 150a. Lip 129 extends along the entire inner perimeter of receptacle 150 and defines a throat along receptacle 150 having a reduced width (slightly less than width $W_{150}$).

Referring still to FIG. 6, seismic node 170 has an outer housing 171 having a central or longitudinal axis 175, a first or upper end 171a, and a second or lower end 171b. In addition, housing 171 has a radially outer surface 172 extending axially between ends 171a, 171b. In this embodiment, outer surface 172 includes an annular recess 173 at upper end 171a and a frustoconical surface 174 extending axially from lower end 171b to recess 173. Seismic node 170 has a height $H_{170}$ measured axially (relative to axis 175) between ends 171a, 171b and a width $W_{170}$ measured perpendicular to axis 175. In this embodiment, the outer periphery of seismic node 170 is generally annular, and in particular frustoconical, and thus, the width $W_{170}$ is also the outer diameter of seismic node 170. The width $W_{170}$ smoothly and continuously increases moving axially from lower end 171b to recess 173, and then abruptly decreases at an upward facing annular shoulder 176 at the transition from frustoconical surface 174 to recess 173.

In this embodiment, each seismic node 170 is relatively small, lightweight, self-powered (e.g., battery powered), rechargeable, stand-alone. In particular, height $H_{170}$ of each seismic node 170 ranges from 10.0 cm and 20.0 cm, the maximum width $W_{170}$ of each seismic node 170 ranges from 2.0 cm to 6.0 cm, and the mass of each seismic node 170 that ranges from 0.10 kg to 0.5 kg. In addition, each seismic node 170 is waterproof and suitable for periodic, extended, and continuous submersion in water depths greater than 50 meters.

As noted above, each seismic node 170 is a self-powered and stand-alone seismic node. As a result, in embodiments described herein, each seismic node 170 operates independently and is not electrically coupled to any other device when deployed for a seismic survey (e.g., when deployed in device 110 as part of an assembly 100). Referring briefly to FIG. 7, a schematic view of one seismic node 170 is shown it being understood the other seismic nodes 170 are the same. As previously described, seismic node 170 includes outer housing 171. In addition, seismic node 170 includes a processor 190 (e.g., microprocessor, central processing unit, or collection of such processor devices, etc.), memory 191, an input interface 193 (e.g., wireless input port, light guide, etc.), an output interface 194 (e.g., wireless communication output port, light guide, etc.), a seismic sensor 195, and a battery 196. In this embodiment, seismic node 170 is rechargeable, and thus, includes a charging assembly 197 (e.g., an inductive charging coil) for recharging battery 196. Processor 190, memory 191, wireless input interface 193, output interface 194, seismic sensor 195, battery 196, and charging assembly 197 are sealed within outer housing 171 to isolate and protect such components from the environment outside outer housing 171 (i.e., outer housing 171 is water proof).

Processor 190, memory 191, interfaces 193, 194, and seismic sensor 195 are coupled to a system BUS that allows the transmission of electronic signals therebetween. In addition, charging assembly 197 is electrically coupled to battery 196 to allow charging of battery 196, and battery 196 is coupled to the system BUS to provide electrical power to processor 190, memory 191, interfaces 193, 194, and seismic sensor 195, as well as other electronic components of seismic node 170. Interface 193 allows data and instructions to be communicated to seismic node 170 and interface 194 allows information and data to be communicated from seismic node 170 (e.g., seismic data and measurements). Processor 190 executes software 192 (e.g., machine-readable instructions) provided on memory 191. Memory 191 can store data communicated to seismic node 170 via input interface 193, the results of any processing executed by processor 190 (e.g., calculations), and the software 192 to be executed by processor 190. Memory 191 may comprise volatile storage (e.g., random access memory), non-volatile storage (e.g., flash storage, read only memory, etc.), or combinations of both volatile and non-volatile storage. Data consumed or produced by the machine-readable instructions can also be stored on memory 191. The software 192 may comprise non-transitory computer readable medium. Seismic sensor 195 detects and measures seismic signals communicated through the ground 32 to the surface 33, and communicates the measured seismic signals to memory 191 where they are stored until offloaded via output interface 194. In general, seismic sensor 195 can be any suitable sensor for detecting and measuring seismic signals communicated through the ground 32 including, without limitation, a motion sensor (e.g., an accelerometer that detects and measures acceleration, a geophone that detects and measures velocity, etc.), a pressure sensor (e.g., a hydrophone), or the like. One example of a suitable seismic node that can be used for seismic node 170 is the Stryde seismic receiver available from Stryde Limited of London, UK. It should be appreciated that the seismic nodes described herein (e.g., seismic nodes 170) are significantly less bulky, have substantially lower weights, and are much less expensive as compared to conventional marine seismic sources often used in transition zones. As a result, seismic nodes 170 are easier to transport, carry, and deploy.

As shown, for example, in FIGS. 2, 3, and 6, due to the relatively small size of seismic nodes 170 and the relatively large number of tightly packed, adjacent receptacles 150 provided in seismic node holding device 110 (rows 151 and columns 152), seismic node assembly 100 can provide a large number of seismic nodes 170 in a small footprint. In general, the greater the number of seismic nodes 170 in a given geographic area during a seismic survey, the better the signal-to-noise ratio that can be obtained in post survey processing via constructive interference of the measured seismic signals. This may be particularly advantageous in "noisy" seismic survey locations such as transition zones (e.g., transition zone 20).

Referring again to FIG. 6, weight blank 180 has a similar outer geometry as seismic node 170. Namely, weight blank 180 has an outer housing 181 having a central or longitudinal axis 185, a first or upper end 181*a*, and a second or lower end 181*b*. In addition, body 181 has a radially outer surface 182 extending axially between ends 181*a*, 181*b*. Similar to outer surface 172 of seismic node 170, in this embodiment, outer surface 182 includes an annular recess 183 at upper end 181*a* and a frustoconical surface 184 extending axially from lower end 181*b* to recess 183. Weight blank 180 has a height $H_{180}$ measured axially (relative to axis 185) between ends 181*a*, 181*b* and a width $W_{180}$ measured perpendicular to axis 185. Similar to seismic node 170, weight blank 180 is generally annular, and in particular frustoconical, and thus, the width $W_{180}$ is also the outer diameter of weight blank 180. The width $W_{180}$ smoothly and continuously increases moving axially from lower end 181*b* to recess 183, and then abruptly decreases at an upward facing annular shoulder 186 at the transition from frustoconical surface 184 to recess 183. Housing 181 of weight blank 180 is filled with ballast material 187 to add weight to seismic node assembly 100 as previously described. Ballast material 187 within housing 181 preferably has a density greater than water. In this embodiment, ballast material 187 is sand, however, in other embodiments, housing 181 may be filled with outer ballast materials 187 such as lead, gravel (e.g., fine gravels), steel, iron, and the like.

Each weight blank 180 has a size similar to seismic nodes 170. Thus, height $H_{180}$ of each weight blank 180 ranges from 10.0 cm and 20.0 cm and the maximum outer width $W_{180}$ of each weight blank 180 ranges from 2.0 cm to 6.0 cm. However, the mass of each weight blank 180 is greater than the mass of seismic nodes 170. Although the mass of each weight blank 180 can be varied and adjusted via the type and amount of material filling housings 181, for most applications, the mass of each weight blank 180 ranges from 0.5 to 2.0 kg.

As will be described in more detail below, weight blanks 180 generally function to removably and adjustably add mass and weight to embodiments of seismic node assemblies disclosed herein (e.g., seismic node assembly 100). Consequently, weight blanks 180 do not include any electronics, moving parts, or any components that may be susceptible to damage from submersion at any depth. Thus, similar to seismic nodes 170, weigh blanks 180 are suitable for periodic, extended, and continuous submersion in water depths greater than 50 meters.

Referring now to FIGS. 6 and 8, in this embodiment, seismic nodes 170 and weight blanks 180 are firmly and removably secured within receptacle 150 via interference fits that restrict and/or prevent the seismic nodes 170 and weight blanks 180 from moving relative to seismic node holding device 110 (e.g., during a seismic survey). In addition, as previously described, weight blanks 180 firmly couple seismic node assembly 100 to the surface 33 and enhance the stability of seismic node assembly 100 in transition zone 20 during seismic surveys. Thus, the interference fits between seismic node holding device 110 and seismic nodes 170 generally function to prevent seismic nodes 170 from moving relative to seismic node holding device 110 during a seismic survey, and weight blanks 180 added to seismic node assembly 100 generally function to prevent seismic node holding device 110 from moving relative to the ground 32 during a seismic survey. Accordingly, the interference fits and weight blanks 180, collectively, function to reduce and/or prevent seismic nodes 170 from moving relative to the ground 32 (and the surface 33) during a seismic survey to ensure a stable coupling therebetween, thereby offer the potential to enhance the quality of the seismic wave measurements (e.g., improved signal-to-noise ratio).

Referring still to FIGS. 6 and 8, in this embodiment, the maximum outer widths $W_{170}$, $W_{180}$ of seismic nodes 170 and weight blanks 180, respectively, are equal or slightly greater than the minimum inner width $W_{150}$ of receptacles 150. As best shown in FIG. 8, seismic nodes 170 and weight blanks 180 are coaxially aligned with the corresponding receptacles 150 (i.e., axes 155, 175 are aligned and axes 155, 185 are aligned) with lower ends 171*b*, 181*b* proximal the open upper end 150*a* of the corresponding receptacle 150, and then axially advanced downward through the open upper end 150*a* and into the corresponding receptacle 150. As best shown in FIG. 6, as seismic nodes 170 and weight blanks 180 are axially advanced into receptacles 150, frustoconical surfaces 174, 184 come into contact and slidingly engage the inner surfaces of body 120 defining receptacles 150 as the outer widths $W_{170}$, $W_{180}$ of seismic nodes 170 and weight blanks 180, respectively, increase along frustoconical surfaces 174, 184, respectively. The maximum outer widths $W_{170}$, $W_{180}$ of seismic nodes 170 and weight blanks 180, respectively, are at the upper portions of frustoconical surfaces 174, 184 adjacent shoulders 176, 186, respectively. Thus, as these portions of seismic nodes 170 and weight blanks 180 are advanced into receptacles 150, an interference fit is formed. Seismic nodes 170 and weight blanks 180 are axially urged into the corresponding receptacles 150 until shoulders 176, 186, respectively, clear lips 129, which may slightly flex radially outward to allow frustoconical surfaces 174, 184 to advance therethrough, and then snap radially inward into recesses 173, 183, respectively, once shoulders 176, 186 are positioned axially below lips 129. Seismic nodes 170 and weight blanks 180 are sized such that lips 129 engage shoulders 176, 186 simultaneous with lower ends 171b, 181b engaging body 120 at the lower end 150b of the corresponding receptacle 150 as shown in FIG. 6. Thus, seismic nodes 170 and weight blanks 180 are firmly secured within the corresponding receptacles 150 with the radial interference fit between housings 171, 181, respectively, lower ends 171b, 181b seated against body 120 at lower ends 150b of corresponding receptacles 150, and shoulders 176, 186 engaging lips 129.

Although lips 129 are provided in this embodiment to supplement and aid the interference fit in maintaining the positions of seismic nodes 170 within receptacles 150, in other embodiments, the lips (e.g., lips 129) are not included and/or an alternative mechanism may be included to maintain and secure the positions of the seismic nodes (e.g., seismic nodes 170) within the receptacles (e.g., receptacles 150). For example, referring briefly to FIG. 12, an alternative mechanism to maintain and secure the positions of a seismic node 170 within a receptacle 150 is shown. In FIG. 12, only one receptacle 150 and corresponding seismic node 170 is shown, however, it is to be understood that any one or more seismic nodes (e.g., seismic nodes 170), weight blanks (e.g., weight blanks 180), or combinations thereof may be releasably maintained and secured within the corresponding receptacle 150 in the same manner as shown in FIG. 12. As shown in FIG. 12, in this embodiment, seismic node 170, is releasably secured within the corresponding receptacle with a bolt 130. In particular, bolt 130 has a head a head 131 slidingly receive in a T-shaped slot 132 in lower end 171b of housing 171 and a shaft 133 that extends from slot 132 through an aperture in the bottom 126 of body 120. A nut 134 is threaded onto the shaft 133 on the opposite side of the bottom 126 of body 120, thereby releasably securing seismic node 170 in position within the corresponding receptacle 150. It should be appreciated that in this embodiment, lips 129 are not provided or relied on to aid in maintaining and securing seismic node 170 within receptacle 150. In addition, as shown in FIG. 12, when seismic nodes 170 are sufficiently seated in receptacles 150 and secured by bolts 130, they do not extend from the corresponding receptacles 150. Although not shown in FIG. 12, weight blanks 180 do not extend from receptacles 150 when sufficiently seated in the corresponding receptacles 150 and secured by bolts 130.

Referring now to FIGS. 1, 8, and 9, in this embodiment, seismic node assembly 100 also includes the optional locating device 18. In this embodiment, locating device 18 is a flag that is removably secured to seismic node holding device 110 and extends vertically from seismic node holding device 110 up to and through the surface 31 of water 30. Thus, locating device 18 provides a visual marker that can be used by a surveyor to determine the specific location of seismic node assembly 100 for retrieval of the seismic node assembly 100 containing device 18, as well as the other seismic node assemblies 100 coupled thereto with cable 15. As best shown in FIG. 9, in this embodiment, flag 18 extends from a base 19 that is seated in a receptacle 150 and secured therein via an interference fit in the same manner as weight blanks 180 previously described.

As previously described, in the embodiment shown in FIG. 1, locating device 18 penetrates the surface 31 of water 30 and can be used by the surveyor to locate the seismic node assemblies 100 for retrieval or other purposes during or after the seismic survey. However, in other embodiments, a different type of locating device may be used instead of locating device 18. For example, as shown in FIG. 13, seismic acquisition system 10 is deployed in deeper water 30, and thus, locating device 18 previously described is not sufficiently tall to penetrate the surface 31 such that the location of system 10 can be easily determined. Accordingly, in this embodiment, a locating device 40 comprising a buoy 41 floating at the surface 31 and a rope or cable 42 extending from buoy 40 to one seismic node assembly 100 is used instead of locating device 18.

Referring again to FIGS. 1 and 2, to construct seismic acquisition system 10, each seismic node assembly 100 is formed by loading seismic nodes 170 and weight blanks 180 into receptacles 150 of seismic node holding device 110 in the predetermined and desired arrangements. In general, the seismic nodes 170 and/or weight blanks 180 can be pre-loaded into seismic node holding devices 110 prior to being transported to transition zone 20 or loaded into seismic node holding devices 110 at transition zone 20 to form seismic node assemblies 100. Before, during, or after loading seismic nodes 170 and/or weight blanks 180, cable 15 is coupled to seismic node holding devices 110. Next, seismic node assemblies 100 are lowered and placed into direct contact with the surface 33 of ground 32 at predetermined installation locations in transition zone 20 for conducting the seismic survey. Seismic node assemblies 100 can be deployed from a vessel at the surface 31 (e.g., lowered from a vessel at high tide 31a) and/or deployed from the ground 32 (e.g., physically transported or carried along the surface 33 at low tide 31b). In either case, seismic node assemblies 100 are placed in contact with surface 33 at the predetermined installation locations and may be gently pushed against the surface 33. As previously described, seismic node assemblies 100 are secured to the surface 33 with bottom 126 directly engaging the surface 33 and horizontally oriented to vertically orient seismic nodes 170. Once seismic node assemblies 100 are deployed and secured to the ground 32 at the desired locations, the seismic survey(s) can be conducted. After the completion of the seismic surveys, seismic node assemblies 100 can be retrieved from transition zone 20 by locating assemblies 100 (e.g., via flag 18 if assemblies 100 are below the surface 31), and then pulling cable 15 or one of seismic node assemblies 100. Cable 15 is coupled to each assembly 100, and thus, by pulling cable 15 or any one assembly 100, the remaining assemblies 100 will be pulled.

As previously described and shown, distinct and separate weight blanks 180 are releasably secured within receptacles 150 of seismic node holding device 110 to add weight to seismic node assembly 100. However, in other embodiments, rather than using weight blanks 180, ballast material 187 may be placed directly into one or more receptacles 150. In other words, select receptacles 150 are filled (partially or fully) with ballast material 187. For example, referring now to FIGS. 14 and 15, an embodiment of a seismic node assembly 100' is shown. Seismic node assembly 100' is the same as seismic node assembly 100 previously described with the exception that select receptacles 150 are directly filled with ballast material 187 as an alternative to using weight blanks 180. The option of directly filling select receptacles 150 with ballast material 187 can eliminate the need to transport, carry, and install premanufactured weight blanks 180. For example, ballast material 187 sourced at the location of the seismic survey (e.g., sand or gravel from transition zone 20) can be used to fill receptacles 150. It should be appreciated that in this embodiment of seismic node holding device 110, the walls of body 120 defining receptacles 150 filled with ballast material 187 are solid and do not include any gaps or holes that may allow ballast material 187 to fall out or otherwise exit the receptacle 150 within which it is intended to be disposed. In general, seismic node assembly 100' is deployed and retrieved in the same manner as assembly 100 previously described.

In the manner described, seismic node assembly 100 includes a plurality of vertically oriented seismic nodes 170 for detecting, measuring, and recording seismic signals reflected upward and communicated through the ground 32 to the surface 33. More specifically, the vertical orientation of seismic nodes 170 in seismic node assemblies 100 enables them to detect, measure, and record the vertical component of seismic waves traveling through the ground 32, which are also referred to as P-waves. However, seismic waves traveling through the ground 32 also include shear waves, which propagate horizontally and perpendicular to the P-waves. Detection and measurement of the shear waves can provide additional information about the subsurface.

Referring now to FIGS. 16 and 17, an embodiment of seismic node assembly 200 that can be used in place of any one or more of assemblies 100 in system 10 is shown. In this embodiment, seismic node assembly 200 includes a device or tray 210, a plurality of seismic sensors or nodes 170 removably seated in seismic node holding device 210, and a plurality of weight blanks 180 removably seated in seismic node holding device 210. Similar to device 110 previously described, device 210 is configured to hold one or more seismic nodes 170 during a seismic survey, and thus, may also be referred to herein as a seismic node holding device or device for holding one or more seismic nodes. Weight blanks 170 and seismic nodes 170 are as previously described, however, as will be described in more detail below, assembly 200 includes a plurality of vertically oriented seismic nodes 170 (with vertically oriented central axes 175) for detecting and measuring P-waves and a plurality of horizontally oriented seismic nodes 170 (with horizontally oriented central axes 175) for detecting and measuring shear waves. In this embodiment, the plurality of seismic nodes 170 include a plurality of seismic nodes 170 with motion sensors (e.g., accelerometers) as the corresponding seismic sensors 195 (FIG. 7), which are illustrated in the color white in FIGS. 16, 17, and 20, and one seismic sensor 170 with a pressure sensor (e.g., a hydrophone) as the corresponding seismic sensor 195 (FIG. 7), which is illustrated in the color black in FIGS. 16, 17, and 20. The weight blanks 180 are illustrated in the color grey in FIGS. 16, 17, and 20. For further clarity and explanation, the seismic node 170 including the hydrophone as the corresponding seismic sensor 195 is also labeled with reference numeral 170'.

Referring now to FIGS. 16-18, seismic node holding device 210 is substantially the same as seismic node holding device 110 previously described with the exception that seismic node holding device 210 also includes a plurality of horizontally oriented receptacles 250. More specifically, seismic node holding device 210 includes a body 220, a plurality of vertically oriented receptacles 150 in body 220, and a plurality of horizontally oriented receptacles 250 in body 220. Similar to body 120, body 220 is made of a rigid or substantially rigid material that is suitable for use in a marine environment. Examples of suitable materials include polymers, polyvinyl chloride (PVC), composites, stainless steel, aluminum, concrete (conventional or biodegradable), and the like. In some embodiments, body 120 is made of a biodegradable material that breaks down over a period of time in cases where seismic node holding device 210 is left behind.

Similar to body 120 previously described, in this embodiment, body 220 has a rectangular prismatic geometry and may be described as having an orthogonal coordinate axis system including a vertically oriented central axis 221, a horizontally oriented central axis 222 that intersects and is perpendicular to axis 221, and a horizontally oriented central axis 223 that intersects and is perpendicular to both axes 221, 222. In addition, body 220 has an outer surface including a top side 225, a bottom side 226 oriented parallel to top side 225, a pair of parallel, lateral sides 227a, 227b, and a pair of parallel, front and rear sides 228a, 228b, respectively. Seismic node assembly 200 is deployed in transition zone 20 with axis 221 oriented vertically, top side 225 facing upward away from the ground 32, and bottom side 226 facing downward and seated firmly against the surface 33 of the ground 32. However, seismic node holding device 210 can be rotated about axis 221 as desired during deployment, and thus, the use of "lateral" to describe sides 227a, 227b, and "front" and "rear" to describe sides 228a, 228b is for convenience and descriptive purposes, and should not be interpreted as limiting the particular locations of sides 227a, 227b, 228a, 228b during deployment in transition zone 20 for performing a seismic survey.

Top side 225 and bottom side 126 face upward and downward, respectively, away from each other and are disposed in parallel horizontal planes oriented perpendicular to axis vertical 221 and parallel to axes 222, 223. Lateral sides 227a, 227b face to the right and left, respectively, away from each other and are disposed in parallel vertical planes oriented perpendicular to axis 222 and parallel to axes 221, 223. Front and rear sides 228a, 228b face forward and backward, respectively, away from each other and are disposed in parallel vertical planes oriented perpendicular to axis 223 and parallel to axes 221, 222. Sides 225, 226 extend horizontally and axially relative to axis 222 between sides 227a, 227b, and extend horizontally and axially relative to axis 223 between sides 228a, 228b. Sides 227a, 227b extend vertically and axially relative to axis 221 between sides 225, 226, and extend horizontally and axially relative to axis 223 between sides 228a, 228b. Sides 228a, 228b extend vertically and axially relative to axis 221 between sides 225, 226, and extend horizontally and axially relative to axis 222 between sides 227a, 227b.

Although each side 225, 226, 227a, 227b, 228a, 228b are described as being disposed in a plane, and hence, is generally planar, in other embodiments, the sides of the body (e.g., sides 225, 226, 227a, 227b, 228a, 228b of body 220) may have other non-planar geometries. As will be described in more detail below, receptacles 150 extend through top side 225, and receptacles 250 extend horizontally through lateral sides 227a, 227b and front and rear sides 228a, 228b.

Body 220 is made of a rigid or substantially rigid material that is suitable for use in a marine environment. Examples of suitable materials include polymers, polyvinyl chloride (PVC), composites, stainless steel, and the like. In some embodiments, body 220 is made of a biodegradable material that breaks down over a period of time in cases where seismic node holding device 210 is left behind.

Referring now to FIGS. 18 and 19, receptacles 150 are as previously described. Namely, receptacles 150 extend vertically (i.e., axially relative to central axis 221) from top side 225 toward bottom side 226. Thus, central axis 155 or each receptacle 150 is oriented parallel to axis 221. Receptacles 150 extend through top side 225 but do not extend through bottom side 226. Thus, open ends 150a of receptacles 150 are located along top side 225 and closed ends 150b of receptacles 150 are adjacent bottom side 226. Each receptacle 150 is the same, and in particular, has a rectangular prismatic shape with a square cross-section taken in any plane oriented perpendicular to axis 221 and uniform minimum width $W_{150}$ measured parallel to axis 222 or axis 223.

Receptacles 150 are arranged in a plurality of parallel rows 251 extending axially relative to axis 222 between lateral sides 227a, 227b and a plurality of parallel columns 252 extending axially relative to axis 223 between front and rear sides 228a, 228b. Thus, rows 251 and columns 252 are generally oriented perpendicular to each other. In this embodiment, body 220 includes ten rows 251 and nine columns 252; each column 252 includes ten receptacles 250 and each row 251 includes nine receptacles 250, resulting in ninety total receptacles 150. However, as previously described, in other embodiments, the receptacles (e.g., receptacles 150) may be arranged in different numbers of rows and columns, the receptacles may be arranged in a pattern that does not include definable rows and/or columns (e.g., an arrangement of concentric rings of receptacles), fewer or more than ninety receptacles may be provided, or combinations thereof. Similar to seismic node holding device 110, in this embodiment, seismic node holding device 210 may include a plurality of discrete magazines (e.g., magazines 111) that are releasably coupled together to form seismic node holding device 210.

Referring now to FIGS. 17, 18, and 19-21, in this embodiment, two receptacles 250 extend into each side 227a, 227b, 228a, 228b of body 220. Each receptacle 250 has a central or longitudinal axis 255 and extends horizontally from one lateral side 227a, 227b, 228a, 228b. The central axes 255 of receptacles 250 are oriented parallel to axis 222, and the central axes 255 of receptacles 250 extending into front and rear sides 228a, 228b are oriented parallel to axis 223. In addition, axes 255 of receptacles 250 extending into lateral sides 227a, 227b and axis 222 are disposed in a common horizontal plane oriented perpendicular to axis 221, and axes 255 of receptacles 250 extending into front and rear sides 228a, 228b and axis 223 are disposed in a common horizontal plane oriented perpendicular to axis 221. Thus, axes 255 of receptacles 250 extending into lateral sides 227a, 227b are oriented perpendicular to the vertical plane containing axes 221, 223, and axes 255 of receptacles 250 extending into front and rear sides 228a, 228b are oriented perpendicular to the vertical plane containing axes 221, 222.

Each receptacle 250 extends horizontally from a corresponding side 227a, 227b, 228a, 228b toward the opposite side 227b, 227a, 228b, 228a, respectively. Receptacles 250 extend through sides 227a, 227b, 228a, 228b and two adjacent vertical receptacles 150 but do not extend beyond the two adjacent vertical receptacles 150. Thus, each receptacle 250 may be described as having an open first end 250a at the corresponding side 227a, 227b, 228a, 228b and a closed second 250b opposite end 250a and adjacent a vertical wall of body 220. In this embodiment, each receptacle 250 is the same, and in particular, has a cylindrical shape with a circular cross-section taken in any plane oriented perpendicular to axis 255. Thus, each receptacle 250 has a uniform or constant diameter or width $W_{250}$ measured perpendicular to axis 255.

As shown in FIG. 21 and previously described, each receptacle 250 has a circular cross-sectional geometry with a width $W_{250}$ that is constant between ends 250a, 250b. In this embodiment, the inner surface of body 220 defining receptacle 250 includes a flange or lip 229 that extends radially inward (relative to axis 255) into each receptacle 250 proximal open end 250a. Lip 229 extends along the entire inner perimeter of receptacle 150 and defines a throat along receptacle 250 having a reduced width (slightly less than width $W_{250}$).

Referring still to FIGS. 16, 17, and 19, seismic nodes 170, 170' and weight blanks 180 are each as previously described, and thus, are removably secured in receptacles 150 in the same manner as previously described with respect to seismic node holding device 110. Namely, seismic nodes 170, 170' and weight blanks 180 are firmly and removably secured within a receptacle 150 via an interference fit that restricts and/or prevents seismic nodes 170, 170' and weight blanks 180 from moving relative to seismic node holding device 210 (e.g., during a seismic survey).

Although distinct and separate weight blanks 180 are releasably secured within receptacles 150 of seismic node holding device 210 to add weight to seismic node assembly 200, in other embodiments, rather than using weight blanks 180, ballast material 187 may be placed directly into one or more receptacles 150 and/or weights may be integrated into device 210. For example, select receptacles 150 can be filled (partially or fully) with ballast material 187 for example, similar to seismic node assembly 100' previously described and shown in FIGS. 14 and 15. Still further, although weight blanks 180 are removably seated in vertical receptacles 150 in seismic node assembly 200, in other embodiments, one or more weight blanks (e.g., weight blanks 180) may be removably seated in horizontally oriented receptacles (e.g., receptacles 250).

Referring now to FIGS. 16, 17, and 19-21, in this embodiment, seismic node assembly 200 includes a plurality of horizontally oriented seismic nodes 170 to detect and measure seismic shear waves (as opposed to seismic P-waves detected and measured by the vertically oriented seismic nodes 170). The horizontally oriented seismic nodes 170 are removably secured in receptacles 250 that extend horizontally from each side 227a, 227b, 228a, 228b. Horizontally oriented seismic nodes 170 are removably secured in receptacles 250 in a similar manner as vertically oriented seismic nodes 170 within receptacles 150.

Referring now to FIG. 21, one horizontally oriented seismic node 170 removably secured in a corresponding receptacle 250 is shown, however, it is to be understood the other horizontally oriented seismic nodes 170 are generally secured in the corresponding receptacles 250 in the same manner. In this embodiment, horizontally oriented seismic node 170 is firmly and removably secured within receptacle 250 via an interference fit that restricts and/or prevents the seismic node 170 from moving relative to seismic node holding device 210 (e.g., during a seismic survey). The maximum width $W_{170}$ of seismic node 170 is slightly greater than the width $W_{250}$ of receptacle 250. As shown in FIG. 19, horizontally oriented seismic node 170 is coaxially aligned with the corresponding receptacle 250 (i.e., axes 255, 175 are aligned) with end 171b proximal the open end 250a of the corresponding receptacle 250, and then axially advanced downward through the open upper end 250a and into the corresponding receptacle 250. As best shown in FIG. 21, as seismic node 170 is axially advanced into receptacle 250, frustoconical surface 174 come into contact and slidingly engages the inner surfaces of body 220 defining receptacle 250 as the outer width $W_{170}$ of seismic node 170 increases along frustoconical surface 174. The maximum outer width $W_{170}$ of seismic node 170 is at the portions of frustoconical surface 174 adjacent shoulder 176. Thus, as this portion of seismic node 170 is advanced into receptacle 250, an interference fit is formed. Seismic node 170 is axially urged into the corresponding receptacle 250 until shoulder 176 clears lip 229, which may slightly flex radially outward to allow frustoconical surface 174 to advance therethrough, and then snap radially inward into recesses 173 once shoulder 176 passes axially beyond lip 229. Seismic node 170 is sized such that lip 229 engages shoulder 176 simultaneous with end 171b engaging body 220 at the lower end 250b of the corresponding receptacle 250 as shown in FIG. 21. Thus, seismic node 170 is firmly secured within the corresponding receptacle 250 with the radial interference fit between housing 171 and body 220 with lower ends 171b seated against body 220 at lower end 250b of corresponding receptacles 250, and shoulder 176 engaging lip 229. As shown in FIG. 21, when seismic nodes 170 are sufficiently seated in receptacles 250, they do not extend from the corresponding receptacles 250.

Referring again to FIG. 16, seismic node assembly 200 is formed and deployed as part of a seismic acquisition system (e.g., system 10) in the same manner as seismic node assembly 100 previously described. In particular, seismic node assembly 200 is formed by loading seismic nodes 170, 170' and weight blanks 180 into receptacles 150, 250 of seismic node holding device 210 in the predetermined and desired arrangements. In general, the seismic nodes 170, 170' and/or weight blanks 180 can be preloaded into seismic node holding device 210 prior to being transported to the installation location (e.g., transition zone 20) or loaded into seismic node holding device 210 at the installation location to form seismic node assembly 200. Before, during, or after loading seismic nodes 170, 170' and/or weight blanks 180, a cable (e.g., cable 15) may be coupled to seismic node holding device 210. Next, seismic node assembly 200 is lowered and placed into direct contact with the surface 33 of ground 32 at the predetermined installation location for conducting the seismic survey. In general, seismic node assembly 200 can be deployed from a vessel at the surface 31 (e.g., lowered from a vessel at high tide 31a) and/or deployed from the ground 32 (e.g., physically transported or carried along the surface 33 at low tide 31b). In either case, seismic node assembly 200 is placed in contact with surface 33 at the predetermined installation locations and may be gently pushed against the surface 33. Seismic node assembly 200 is secured to the surface 33 with bottom 226 directly engaging the surface 33 and horizontally oriented to vertically orient seismic nodes 170, 170' disposed in receptacles 150 and horizontally oriented seismic nodes 170 in receptacles 250. Once seismic node assembly 200 is deployed and secured to the ground 32 at the desired location, the seismic survey(s) can be conducted. After the completion of the seismic survey(s), seismic node assembly 200 can be retrieved in the same manner as seismic node assembly 100 previously described.

Referring now to FIGS. 22 and 23, an embodiment of seismic node assembly 300 that can be used during a seismic survey (e.g., in place of any one or more of assemblies 100 in system 10) is shown. In this embodiment, seismic node assembly 300 includes a seismic node holding device 310 and a plurality of seismic sensors or nodes 170 removably seated in seismic node holding device 310. Similar to device 110 previously described, device 310 is configured to hold one or more seismic nodes 170 during a seismic survey, and thus, may also be referred to herein as a seismic node holding device or device for holding one or more seismic nodes. Although no weight blanks (e.g., weight blanks 180) are provided in this embodiment of assembly 300, in other embodiments, one or more weight blanks may be included. Seismic nodes 170 are as previously described.

Assembly 300 includes a plurality of seismic nodes 170. In this embodiment, the plurality of seismic nodes 170 include one or more seismic nodes 170 with motion sensor(s) (e.g., an accelerometer that detects and measures acceleration, a geophone that detects and measures velocity, etc.), which are illustrated in the color white in FIG. 22, and one seismic node 170 with pressure sensor(s) (e.g., a hydrophone), which are illustrated in the color black in FIG. 22. For further clarity and explanation, the seismic node 170 including the pressure sensor as the corresponding seismic sensor 195 is also labeled with reference numeral 170'.

Seismic node holding device 310 is similar to seismic node holding device 210 previously described with the exception that device 310 includes a body 320 that is cubic and can be deployed and positioned in a variety of different orientations during a seismic survey. In particular, body 320 has an outer surface including six sides 327a, 327b, 327c, 327d, 327e, 327f. Sides 327a, 327b are oriented parallel to each other, sides 327c, 327e are oriented parallel to each other, and sides 327d, 327f are oriented parallel to each other. In addition, sides 327a, 327b, sides 327c, 327e, and sides 327d, 327f are oriented orthogonal to each other. Although sides 327a, 327b are illustrated as the top and bottom, respectively, of body 320 and sides 327c, 327d, 327e, 327f are illustrated as the lateral sides of body 320 in FIG. 22, as body 320 can be deployed and positioned in a variety of different orientations during a seismic survey, any given side 327a, 327b, 327c, 327d, 327e, 327f may define the top, bottom, or one of the lateral sides of body 320 when assembly 300 is seated against the surface 33 of the ground 32 during a seismic survey.

Body 320 includes a plurality of receptacles 150 extending perpendicularly from side 327a, a plurality of receptacles 250 extending perpendicularly from side 327c, and a receptacle 250 extending perpendicularly from side 327d. Each receptacle 150 has a central or longitudinal axis 155 and each receptacle 250 has a central or longitudinal axis 255 as previously described. In this embodiment, four receptacles 150 extend into side 150, two receptacles 250 extend into side 327c, and one receptacle 250 extends into side 327b. However, in other embodiments, the number of receptacles (e.g., receptacles 150, 250) extending from each side of the body (e.g., each side 327a, 327b, 327c, 327d, 327e, 327f of body 320) may vary. Each seismic node 170, 170' is seated in a corresponding receptacle 150, 250 as previously described. When seismic nodes 170, 170' are sufficiently seated in receptacles 150, 250, they do not extend from the corresponding receptacles 150, 250.

Receptacles 250 extending from side 327c are generally oriented perpendicular to receptacle 250 extending from side 327d, receptacles 250 extending from side 327c are generally oriented perpendicular to receptacle 150 extending from side 327a, and receptacle 250 extending from side 327d is generally oriented perpendicular to receptacle 150 extending from side 327a. More specifically, as best shown in FIG. 23, a reference plane $P_1$ that contains central axes 175, 155 of seismic node 170 and the corresponding receptacle 150 extending from side 327a, respectively, is oriented perpendicular to central axes 175, 255 of seismic node 170 and the corresponding receptacle 250 extending from side 327d, respectively; and a reference plane $P_2$ that contains central axes 175, 155 of seismic node 170 and the corresponding receptacle 150 extending from side 327a, respectively, is oriented perpendicular to central axes 175, 255 of seismic nodes 170, 170' and the corresponding receptacles 250 extending from side 327c, respectively. Reference planes $P_1$, $P_2$ are oriented perpendicular to each other.

Similar to body 120, body 320 is made of a rigid or substantially rigid material that is suitable for use in a marine environment. Examples of suitable materials include polymers, polyvinyl chloride (PVC), composites, stainless steel, and the like. In some embodiments, body 320 is made of a biodegradable material that breaks down over a period of time in cases where seismic node holding device 310 is left behind.

It should be appreciated that when assembly 300 is deployed, receptacles 150 may not be vertically oriented and receptacles 250 may not be horizontally oriented although they are shown with those orientations in FIG. 22. Although each side 327a, 327b, 327c, 327d, 327e, 327f is generally disposed in a plane, and hence, is generally planar, in other embodiments, the sides of the body (e.g., sides 327a, 327b, 327c, 327d, 327e, 327f of body 320) may have other non-planar geometries.

Seismic node assembly 300 is formed and deployed alone or as part of a larger seismic acquisition system (e.g., system 10) in generally the same manner as seismic node assembly 100 previously described. In particular, seismic node assembly 300 is formed by loading seismic nodes 170, 170' into receptacles 150, 250 of seismic node holding device 310 in the predetermined and desired arrangement. In general, the seismic nodes 170, 170' can be preloaded into seismic node holding device 310 prior to being transported to the installation location (e.g., transition zone 20) or loaded into seismic node holding device 310 at the installation location to form seismic node assembly 300. Next, seismic node assembly 200 is lowered and placed into direct contact with the surface 33 of ground 32 at the predetermined installation location for conducting the seismic survey. Due to the general perpendicular orientation of at least three seismic nodes 170 as described above, assembly 300 can be deployed with any side 327a, 327b, 327c, 327d, 327e, 327f seated against the surface 32 of the ground 33, while still allowing the detection and measurement of S-waves and shear waves. In general, seismic node assembly 300 can be deployed from a vessel at the surface 31 (e.g., lowered from a vessel at high tide 31a) and/or deployed from the ground 32 (e.g., physically transported or carried along the surface 33 at low tide 31b). In either case, seismic node assembly 300 is placed in contact with surface 33 at the predetermined installation locations and may be gently pushed against the surface 33. Seismic node assembly 300 is secured to the surface 33 with one side 327a, 327b, 327c, 327d, 327e, 327f directly engaging the surface 33 and substantially horizontally oriented to vertically orient one or more seismic nodes 170 disposed in receptacles 150, 250 and horizontally oriented at least two seismic nodes 170 in receptacles 150, 250. Once seismic node assembly 300 is deployed and secured to the ground 32 at the desired location, the seismic survey(s) can be conducted. After the completion of the seismic survey(s), seismic node assembly 300 can be retrieved in the same manners as previously described.

In the embodiments of seismic node assemblies 100, 100', 200 described herein, weight can be added to seismic node holding devices 110, 210 via weight blanks 180 or ballast material 187. However, in other embodiments, weight(s) may be part of or integral with the body (e.g., body 120, 220) of the seismic node holding device (e.g., device 110). For example, metal weight(s) may be cast or molded as part of the body. The weights can be positioned at any one or more locations within the body as desired and based on the deployment location. In general, it should be appreciated that weight may be added to embodiments of the seismic node holding devices disclosed herein (e.g., devices 110, 210) by the addition of weight blanks 180, ballast material, 187, weights integral with the body, or combinations thereof. It is also to be understood that in some embodiments, the weight of the seismic node assembly (e.g., seismic node assembly 100, 100', 200) is sufficient to maintain the desired position of the seismic node assembly during the seismic survey without adding any additional weight(s). Accordingly, in some embodiments, no additional weight (e.g., no weight blanks 180, no ballast material, 187, and no weights integral with the body) are included in the node holding device (e.g., device 110, 210) or seismic node assembly (e.g., seismic node assembly 100, 100', 200).

In the embodiments of seismic node assemblies 100, 100', 200 disclosed herein, seismic nodes 170, 170' and weight blanks 180 are releasably secured within the corresponding receptacles 150, 250 via interference fit as described above. However, in other embodiments, different structures and/or methods can be employed to releasably secure the seismic nodes (e.g., seismic nodes 170, 170') and the weight blanks (e.g., weight blanks 180) within the corresponding receptacles (e.g., receptacles 150, 250). For example, as previously described and shown in FIG. 12, a bolt 130 may be used to secure one or more (e.g., seismic nodes 170, 170'), weight blanks (e.g., weight blanks 180), or combinations within the corresponding receptacles (e.g., receptacles 150, 250).

In the manner described, embodiments of seismic acquisition systems (e.g., system 10) and seismic node assemblies (e.g., seismic node assemblies 100, 100', 200) disclosed herein can be used to perform seismic surveys. In general, embodiments described herein can be used on land, subsea, or in transition zones. However, The embodiments described herein may be particular suited for use in transition zones. For example, embodiments described herein are suitable for periodic, extended, and continuous submersion in water depths typical in transition zones and may include adjustable added weight (e.g., weight blanks 180 and/or ballast materials 187) to enhance coupling to variable substrates and withstand relatively high environmental common in transition zones. Such attributes offer the potential to enhance and maintain stability during seismic surveys in transition zones and increase the seismic signal-to-noise ratios during subsequent processing of seismic data. Still further, embodiments of seismic acquisition systems and seismic node assemblies described herein are relatively light weight, easily transported and carried, less bulky, and less expensive than most conventional marine seismic acquisition systems and devices. Consequently, embodiments described herein may assembled at the point-of-use and enable a greater number of seismic nodes to be deployed for a seismic survey, which may also enhance the seismic signal-to-noise ratios during subsequent processing of seismic data. Although embodiments have been described herein generally in the context of active seismic surveying, it is to be understood that embodiments described herein can also be used in passive seismic surveying.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A seismic node assembly for detecting and measuring seismic signals during a seismic survey, the seismic node assembly comprising:
   a device for holding a plurality of seismic nodes, wherein the device includes:
      a body having an outer surface, a first receptacle extending from the outer surface into the body, and a second receptacle extending from the outer surface into the body, wherein the outer surface includes a top side and a bottom side configured to be seated against a surface of the ground during a seismic survey, wherein the first receptacle extends vertically from the top side;
      a first seismic node removably seated in the first receptacle, wherein the first seismic node has a central axis that is vertically oriented within the first receptacle; and
      a second seismic node removably seated in the second receptacle;
   wherein each seismic node is configured to operate independently and is not electrically coupled to any other device during the seismic survey.

2. The seismic node assembly of claim 1, wherein the outer surface of the body includes a plurality of lateral sides extending from the top side to the bottom side, wherein the second receptacle extends horizontally from a first lateral side of the plurality of lateral sides into the body, wherein the second seismic node has a central axis that is horizontally oriented within the second receptacle.

3. The seismic node assembly of claim 2, further comprising a third seismic node, wherein the device for holding one or more seismic nodes includes a third receptacle extending horizontally from the first lateral side or a second lateral side of the plurality of lateral sides into the body, wherein the third seismic node is removably seated in the third receptacle and has a central axis that is horizontally oriented within the third receptacle.

4. The seismic node assembly of claim 1, wherein each seismic node includes a seismic sensor, wherein the seismic sensor of the first seismic node is an accelerometer or a geophone and the seismic sensor of the second seismic node is a hydrophone.

5. The seismic node assembly of claim 1, wherein each seismic node is removably secured in the corresponding receptacle by an interference fit.

6. The seismic node assembly of claim 1, further comprising a weight blank configured to add weight to the seismic node assembly;
   wherein the device for holding one or more seismic nodes includes a third receptacle extending from the top side into the body, wherein the weight blank is removably seated in the third receptacle.

7. The seismic node assembly of claim 6, wherein the weight blank comprises an outer housing and weight ballast disposed in the outer housing.

* * * * *